United States Patent [19]

Polly

[11] Patent Number: 5,113,721
[45] Date of Patent: May 19, 1992

[54] METHOD AND APPARATUS FOR CONTROLLING A MOTOR VEHICLE DRIVE TRAIN

[75] Inventor: Johann Polly, Neunkirchen, Austria

[73] Assignee: Auto Polly Gesellschaft M.B.H., Neunkirchen, Austria

[21] Appl. No.: 474,045

[22] PCT Filed: Oct. 11, 1988

[86] PCT No.: PCT/AT88/00080

§ 371 Date: Apr. 12, 1990

§ 102(e) Date: Apr. 12, 1990

[87] PCT Pub. No.: WO89/03319

PCT Pub. Date: Apr. 20, 1989

[30] Foreign Application Priority Data

Oct. 12, 1987 [AT] Austria .......................... A2680/87

[51] Int. Cl.⁵ .............................................. B60K 31/04
[52] U.S. Cl. ........................................ 74/866; 74/870; 74/877; 364/424.1
[58] Field of Search ................. 74/866, 877, 870; 364/424.1

[56] References Cited

U.S. PATENT DOCUMENTS

| | | | |
|---|---|---|---|
| 4,046,032 | 9/1977 | Braun et al. | 74/877 X |
| 4,258,591 | 3/1981 | Eckert et al. | 74/870 X |
| 4,350,057 | 9/1982 | Kishi et al. | 74/866 |
| 4,473,882 | 9/1984 | Suzuki et al. | 364/424.1 |
| 4,599,917 | 7/1986 | Leorat et al. | 74/870 X |
| 4,638,690 | 1/1987 | Hattori et al. | 74/870 X |
| 4,643,048 | 2/1987 | Hattori et al. | 74/877 X |
| 4,685,062 | 8/1987 | Uriuhara et al. | 364/424.1 |
| 4,737,915 | 4/1988 | Hosaka | 364/424.1 X |
| 4,757,449 | 7/1988 | Kurihara et al. | 364/424.1 |
| 4,829,434 | 5/1989 | Karmel et al. | 74/866 X |
| 4,846,022 | 7/1989 | Ito et al. | 74/877 |
| 4,933,850 | 6/1990 | Wheeler | 364/424.1 |

FOREIGN PATENT DOCUMENTS

| | | |
|---|---|---|
| 0096352 | 12/1983 | European Pat. Off. ......... 364/424.1 |
| 0144608 | 6/1985 | European Pat. Off. |
| 2714559 | 10/1978 | Fed. Rep. of Germany |
| 2811574 | 9/1979 | Fed. Rep. of Germany |
| 3526671 | 1/1987 | Fed. Rep. of Germany |
| 8501256 | 6/1985 | PCT Int'l Appl. |
| 2151048 | 7/1985 | United Kingdom |

*Primary Examiner*—Leslie A. Braun
*Assistant Examiner*—Matthew Stavish
*Attorney, Agent, or Firm*—Spencer, Frank & Schneider

[57] ABSTRACT

A control for the drive train of a motor vehicle is disclosed. The motor vehicle is equipped with an electronic engine power control and an automatic transmission. In addition to the position of an accelerator pedal (25) serving as the power control member, its movements as well as the movements of the brake pedal (16) are monitored by a computer (10) and predetermined motion sequences are selectively picked up as direct gear selection control instructions from the driver in order to possibly initiate gear changing processes after the permissibility of the new gear has been determined. Automatic upshifting processes are suppressed when the accelerator pedal is released as long as the number of engine revolutions remains below a predetermined engine specific maximum number of revolutions. On the other hand, movements of the accelerator pedal (25) are directly influenced by the computer (10).

25 Claims, 9 Drawing Sheets

METHOD AND APPARATUS FOR CONTROLLING A MOTOR VEHICLE DRIVE TRAIN

FIELD OF THE INVENTION

The invention relates to a method of controlling the drive train of a motor vehicle equipped with an electronic engine power control which has an associated accelerator pedal for the actuation of a throttle valve or control rod, a brake pedal and an automatic transmission. e.g. an automatic gear shifting mechanism including an electronically controlled mechanical dry clutch, by means of operating data, characteristic values and parameters, with certain pedal movements being picked up as arbitrary gear shifting instructions from the driver.

The invention further relates to an apparatus for implementing such a method, the apparatus including at least one driving power reference value generator associated with and picking up the position of an accelerator pedal serving as the power control member. This reference value generator is connected with a processor control unit for determining a suitable gear and for automatically controlling gear changing processes, with moreover the input of the processor control unit being connected with a memory device for characteristic data of the motor vehicle, with at least one sensor associated with the brake pedal and with sensors for picking up operating data, such as the number of engine revolutions per minute, engine temperature, driving speed, clutch position and gear identification, while the output of the processor control unit is connected with an output circuit for actuating the transmission, the clutch and the engine throttle or control rod.

PRIOR ART

Automatic transmissions and automatic controls for the transmission or, more generally, the drive train of a motor vehicle equipped with an internal combustion engine are known in many configurations, see, for example, DE-A 2,811,574 or DE-A 3,526,671. Customarily, the known controls determine their gear shifting points, which sometimes are also adaptive, by the position of the throttle valve and the engine load as well as the number of revolutions of the driving or driven transmission shaft, with a memory associated with the electronic control, customarily a so-called ROM (read only memory - fixed value memory), storing the appropriate engine specific and vehicle specific data and characteristics. It is also known to provide a so-called driving mode setting device for providing a driving mode parameter for a more consumption optimized or a more performance oriented driving mode. By means of a shift lever it is additionally possible to block the higher gears or to hold the lowest gear.

With respect to a value indicating the driving mode, EP-A 0,144,608 has already proposed to calculate in a processor, on the basis of cyclical sampling of the accelerator pedal positions and the thus obtained accelerator pedal signal values, an accelerator pedal activity indicating the driving style of the respective driver and also the driving situation. This accelerator pedal activity information is then also considered in the determination of the threshold values for the shifting processes.

On the other hand, also known is an electronic engine power control in which the "electronic" accelerator pedal serves as the power control member whose position is picked up by a sensor, the reference value generator for the driving power, and converted into a corresponding electrical signal. This accelerator pedal position signal is fed, customarily together with further sensor signals such as, in particular those which contain informations about the number of engine revolutions per minute, the driving speed, the identification of the momentarily employed gear, the engine temperature and similar operating data, by way of an input circuit in which, for example, the signals are converted from analog to digital and are processed accordingly, to a microprocessor which then, on the basis of these signals, actuates by way of an output circuit including an electronic power system, an electrical servomotor which actuates the throttle or the injection pump adjustment lever or the control rod. Such an electronic system can also perform other functions, such as, for example, idling speed stabilization, rotational speed limitation, regulation of slip and drag of the drive system, driving speed regulation or "cruise control" (the so-called "Tempomat"), buck control ("Bonanza oscillations"), detection of progression and electronic magnification, and the like.

DE-A 2,714,559, for example, discloses a control system for multi-step reduction gears in which comparatively quick movements of the accelerator pedal or, more precisely, of the throttle valve, are to be picked up as arbitrary gear shifting instructions from the driver. However, the derivation of gear shifting instructions from an accelerator pedal movement performed at a certain minimum velocity alone is conceivably unreliable since it is quite evident that an intentional or unintentional movement of the accelerator pedal that is somewhat too fast may be caused, for example, by a special traffic situation. Moreover, the driver is able only within limits to initiate a gear shifting process in a certain direction, up or down, since the direction of shifting is ultimately determined not by the driver but primarily by the momentary number of engine revolutions.

Thus, the prior art control system may lead to undesirable gear shifting processes. If, for example, on a downhill stretch before a curve, the driver were to take the accelerator pedal back somewhat too quickly, a completely unnecessary upshifting process may be initiated while a precautionary downshifting process would really be advisable.

Finally, electronically controlled mechanical dry clutches are known, which are actuated by means of electromotive path adjusters or pneumatically by means of subatmospheric pressure and are equipped with a position reporting member, with the actuation likewise being effected by means of a microprocessor and a power electronic system connected to its output. In this case, the clutch is disengaged automatically at every change of gears and whenever the engine speed drops to below a minimum number of revolutions per minute or, in the higher gears, whenever the accelerator pedal is in the zero position. The re-engagement of the clutch is controlled in dependence on the gear when the "gas" pedal is depressed. During braking, the clutch is engaged as a function of the brake pressure. In this way, the disconnection of thrust is utilized for fuel economy. At the of driving, the clutch is engaged as a function of the engine speed so that, with the accelerator pedal in the corresponding position, the engine always remains in a speed range of maximum engine torque and the period of slip is limited by positive engagement of the clutch. During shifting the clutch is engaged at a time which is dependent on the individual gears and on the position of the accelerator pedal. If the vehicle is standing still with the engine running, the clutch is engaged upon actuation of the accelerator pedal only if a start-up or reverse gear has been selected.

The drawback in the prior art drive train controls is that, in all prior art automatic gear shifting controls, the number of gears required for optimization of fuel consumption and the overdrive spread leads to such a high frequency of gear shifting that its practical use has not yet been contemplated. In the prior art controls, the computer does not have an possibility of obtaining information about the probable further development of the power requirement. If the accelerator pedal is released for a short-term reduction in speed, e.g. in a line of vehicles, before passing or before intersections, the computer will very often initiate completely unnecessary upshifting processes which then require downshifting again after a short time. On the other hand, acceleration processes, e.g. a depression of the accelerator pedal that is only 1 mm too far often also initiates unnecessary downshifting processes. Sufficient acceleration could often also be realized in a higher gear without shifting at a lower number of engine revolutions per minute, greater torque and thus better engine efficiency and lower noise development.

SUMMARY OF THE INVENTION

Generally it is thus the object, in connection with an automatized drive train for motor vehicles including an internal combustion engine equipped with an electrical engine power control, an identification converter of optimum mechanical efficiency, for example an automatic gear shifting mechanism, and an electronically controlled mechanical dry clutch, to bring the greatest operating frequency of the engine into congruence with the optimum range for the specific fuel consumption within the characteristics of the respective engine as best as possible in all driving ranges which determine fuel consumption, i.e. primarily for the acceleration phases, hill climbing and driving at a constant speed.

More in detail, it is therefore an object of the invention to provide a method and an apparatus for automatically controlling the drive train of a motor vehicle, wherein the driver is able, in a simple and risk-free manner, to initiate anticipatory precautionary gear shifting processes independently of the momentary power requirements and, on the other hand, unnecessary shifting processes are suppressed while, nevertheless, the parameters and characteristics (characteristic fields) given by the motor vehicle, and particularly its drive train, and stored in a memory are considered, for example in order not to exceed critical numbers of revolution while ensuring the lowest possible fuel consumption.

The method according to the invention as indicated above is characterized in that, the movements of the accelerator pedal and/or the movements of the brake pedal are monitored for motion sequences including changes in the direction of movement and certain, predetermined sequences including changes in direction are selectively picked up as direct gear selection control instructions from the driver, with the respective gear and its permissibility being calculated and examined on the basis of operating data and parameters and then, if required, a gear shift including actuation of the clutch is initiated. During the process of changing gears, the number of engine revolutions per minute resulting in the new gear is controlled by the engine power control system independently of the position of the accelerator pedal while, on the other hand, automatic upshifting processes due to the mere release of the accelerator pedal are suppressed as long as the number of engine revolutions per minute remains below a permissible maximum number.

In a corresponding manner, the apparatus according to the invention as described above is characterized in that the processor control unit includes a module for continuously monitoring the movements of the accelerator pedal and/or the brake pedal for motion sequences including changes in the direction of movement and for the selective pickup of certain, predetermined motion sequences including changes of direction as direct gear selection control instructions from the driver.

Thus, according to the invention, in contrast to the prior art, selective analyses of pedal movement sequences are performed and, gear changing processes are initiated if necessary on the basis of these exact analyses of the determined pedal movements so that the driver is able to initiate anticipatory arbitrary gear shifting processes directly and completely independently of the momentary power requirement or throttle or control rod position. Thus, the driver, as he observes the existing traffic situation, is included in the control system as a correction factor that is active from case to case, with a sliding transition from the automatic system to the driver and vice versa being ensured. In view of the desired savings in fuel, such a control is particularly advantageous in conjunction with transmissions including a larger number of gears and a greater overdrive spread such as, for example, in an automatic synchronous spur gear transmission for automobiles equipped with five or six gears and a great overdrive spread, or in dual clutch transmissions which are shiftable under load, for example for sports cars. Also, for finely graduated multi-gear auxiliary transmission for trucks, the control according to the invention is able to reduce the shifting frequency to a reasonable degree even if the gear shifting processes are initiated fully automatically. Most of all, the truck driver is thus able to initiate shifting processes in advance merely by means of the accelerator or brake pedal.

According to the invention, it is of particular advantage if during an accelerator pedal motion sequence in which, with the vehicle moving, the accelerator pedal is moved into the zero position and from this zero position into a first, at least approximate rest position in which the velocity of the accelerator pedal movement falls below a predetermined value, the engine speed range associated with this accelerator pedal rest position is determined on the basis of characteristic values stored for this purpose, with the number of engine revolutions per minute associated with the respective accelerator pedal position preferably being approached continuously but no later than at the moment of the first accelerator pedal rest position. The associated transmission gear is determined as a function of the momentary vehicle speed and the shifting and clutch engaging processes are initiated, whereupon the engine power is again controlled by the position of the throttle or the control rod primarily in dependence on the position of the accelerator pedal.

In a corresponding manner, an embodiment of the apparatus according to the invention, which is advantageous for safety reasons, is distinguished by the fact that the accelerator pedal has an associated separate sensor which detects the zero position of the accelerator pedal.

Thus, the driver is able at any time, particularly after rolling or braking processes, to select the engine speed range and thus the transmission gear which, at the driving speed of the moment, corresponds to this speed range by briefly releasing the accelerator pedal back into the zero position and then selecting the accelerator pedal position. Following such a gear selection, the accelerator pedal positions have associated engine torques which result from a control of the throttle valve or the control rod as known from prior art engine power controls.

In this connection, it is advantageously possible to determine, from the velocity of the movements of the accelerator pedal as it travels from the zero position into the first, at least approximate rest position, a driving mode parameter which indicates the driver's driving style, e.g. as it influences the number of engine revolutions per minute at which gear shifting takes place and/or the critical engine torques. The number of engine revolutions per minute for the start-up process can also be determined on the basis of the first rest position; further processes, which will be described below, can also be controlled as a function of this driving mode parameter.

It is possible to define a large number of different driving mode parameters, for example a continuous series of values based, for example, on the first rest position and/or the velocity of the accelerator pedal movement. However, it has been found to be sufficient and advisable with respect to simplification of the control processes, to provide only two driving mode parameters. Accordingly, it is of particular advantage to determine a driving mode parameter for power oriented driving at an averaged velocity of accelerator pedal movements which is greater than a predetermined velocity value for which higher engine rpm's and/or critical engine torques are set for a gear change than for another driving mode parameter for optimized fuel consumption where the average velocity of the accelerator pedal movements is lower than the predetermined velocity value.

Since the movements of the accelerator pedal are monitored and selected continuously it is easily possible in the course of this constant monitoring to constantly bring the driving mode parameter up to date, in which case it is of particular advantage if the driving mode parameter is newly determined after every movement of the accelerator pedal into the zero position and from it into the first, at least approximate rest position.

It is also favorable if, during movement of the accelerator pedal into the zero position in the case of downhill driving, the otherwise provided clutch disengagement process is suppressed as long as the number of engine revolutions per minute exceeds a predetermined minimum number to thus exclude an increase in vehicle acceleration or a reduction in vehicle deceleration when the accelerator pedal is returned to the zero position. A downhill stretch can be determined by the control, for example, by a query as to whether the change in the vehicle speed over time before the clutch disengagement process is greater than a gear specific stored negative parameter value or whether during an already initiated clutch disengagement process the second derivative of the vehicle speed becomes positive over time.

If, in this case of suppression of clutch disengagement, the brake pedal is actuated, it is of further advantage if at the end of the braking process and after release of the brake pedal, a clutch disengagement process is initiated in order to permit acceleration processes without engine power on downhill stretches. In this way it is possible here as well to save fuel.

For safety reasons it is also advantageous if, an upshifting process is suppressed when the accelerator pedal is moved, with the clutch disengagement process suppressed, from the zero position into the first, at least approximate rest position, independently of the fact that this rest position otherwise determines the gear selection.

For arbitrary gear shifting up or down in a driving mode which evaluates the traffic situation in advance, it is of particular advantage if back and forth movement of the accelerator pedal beyond a predetermined minimum amount and within a predetermined time period is picked up as an arbitrary gear shift control instruction, with backward and forward movement of the accelerator pedal being picked up as an upshift control instruction and forward and backward movement of the accelerator pedal as a downshift control instruction, with a change in gears being initiated after determination by calculation of the permissibility of the number of engine revolutions per minute in the new gear.

In a corresponding manner it may be advantageously provided that during a braking process the changes in the direction of movement of the brake pedal are picked up by monitoring the brake pressure curve and that a temporary reduction in pressure by a predetermined minimum amount within a predetermined period of time is selectively picked up as an upshift control instruction and a temporary increase in pressure by a predetermined minimum amount within a predetermined period of time is selectively picked up as a downshift control instruction, with a change in gears being initiated after a determination by calculation of the permissibility of the number of engine per minute in the new gear.

For safety reasons it is particularly favorable, in order to prevent the brakes from becoming hot, if, before a change in gears is initiated upon the detection of an upshift control instruction, the permissibility of the new gear is determined with respect to the brake temperature and/or possible downgrade travel.

Moreover, an embodiment that is particularly advantageous in view of the desired optimization of fuel consumption is characterized in that, during an accelerator pedal motion sequence in which the pedal is moved into a predetermined position detectable by the becoming effective of a force threshold and is held in that position, possibly with a driving mode parameter for consumption optimized driving, the throttle or control rod is continuously actuated corresponding to the number of engine revolutions per minute so that the specific fuel consumption that is best for the respective number of engine revolutions per minute according to the engine characteristics is realized. Advisably it is provided in this connection that vehicle specific, speed dependent throttle characteristics are stored on the basis of which the control system associates the accelerator pedal position at the force threshold of the number of engine revolutions per minute with that throttle opening that ensures, at the momentary engine speed, the optimum specific fuel consumption corresponding to the likewise stored engine characteristics. The control system here suppresses downshifts at accelerator pedal positions up to the force threshold unless a technical minimum number of engine revolutions determined as a function of parameters is not reached or, if a "Tempomat" speed control is installed, this speed control is activated (in which case gear shifting processes are not suppressed). On the other hand, it is advantageous if during movement of the accelerator pedal beyond the force threshold position, continuously rising minimum numbers of engine revolutions per minute are associated with the accelerator pedal positions, with these continuously increasing minimum number of engine revolutions per minute being provided and stored for the automatic downshifting processes; however, they may also be a function of the driving mode parameter, in which case, for a driving mode parameter for power oriented driving, the minimum number of engine revolutions per minute for the completely depressed accelerator pedal may correspond approximately to the number of revolutions per minute at maximum power.

The mentioned force threshold may be fixed with respect to the path of the accelerator pedal and, in that case, it is advisable to provide a separate spring for the accelerator pedal in order for it to reach the force threshold.

On the other hand, high fuel savings can be realized if the position in which the force threshold becomes effective is varied in correspondence with the throttle or control rod position so that optimum engine efficiency is obtained at the respective number of engine revolutions per minute. In this connection, it is advisably provided that, in order for the accelerator pedal to reach the force threshold, an actuator is provided which is controlled by the processor control unit.

It is also of advantage if, upon release of the accelerator pedal and suppression of automatic upshifting processes, the resulting constantly more unfavorable engine efficiency is signaled to the driver by the application of a haptic signal, for example in the form of increasingly stronger pulses or vibrations that are applied to the accelerator pedal. In a corresponding manner, it is advisably provided that, for application of the haptic signals, the accelerator pedal has an associated electromechanical drive, preferably a vibrator, which is actuated by the processor control unit. Insofar as the above-mentioned actuator (for the force threshold) is provided, this actuator can advantageously also be used as the signal generator for the haptic signals.

Once the pedal travel has become zero and if the highest gear is already employed and, further, if the number of engine revolutions at the present engine temperature becomes too low for smooth operation in the higher gear, these haptic signals are suppressed.

In order not to prematurely irritate the driver, it is also advisable for the haptic signal to be applied to the accelerator pedal with a time delay, with this time delay and/or the signal intensity possibly being selected as a function of a driving mode parameter.

An advantageous embodiment of the method according to the invention is then characterized in that, before the selective pickup of the predetermined motion sequences including changes in the direction of movement, a check is made as to the presence of sensor signals for brake pressure, for the response of the brake pedal and for a brake pedal that has been moved into its end position, with the presence of such sensor signals causing the selective pickup of the motion sequences including changes in the direction of movement of the accelerator pedal to be suppressed and downshifting processes to be initiated during downhill travel and possibly also on level ground in a speed range above a predetermined speed value, if the brakes are hot.

In a corresponding manner, an embodiment of the apparatus according to the invention is characterized in that priority inputs of the processor control unit are connected with a brake pressure sensor, a brake pedal contact sensor and with a safety sensor which detects the completely depressed position of the brake pedal.

In this embodiment, the brake pressure sensor, the brake pedal response or brake contact sensor (which simultaneously may serve as the brake light switch) and, for safety reasons in the case of brake failure, the sensor for the completely depressed brake pedal, in principle always take precedence over all accelerator pedal signals and, on the basis of their signals, downshifting processes are initiated during downhill travel and if the brakes are hot in a high speed range on level ground as well. In this connection it is of particular advantage if, in order to initiate the downshifting processes, the engine speed range is calculated as a function of the brake pressure, the driving speed, the previously engaged gear, the vehicle deceleration and the brake temperature and the result of these calculations is used to determine the necessary gear and examine the permissibility of the number of engine revolutions per minute in the determined gear.

Preferably the processor control unit includes a processor which is connected to a program memory, e.g. in the form of a ROM, that contains fixed program modules for the detection of certain motion sequences including changes in the direction of movement.

In summary, it thus results that, according to the invention, it is possible for the first time for a driver to directly initiate upshifting and downshifting processes completely independently of the momentary power requirement and throttle or control rod position, by way of the accelerator pedal and the brake pedal, respectively. Moreover, the driver is reminded of this possibility for action by way of the accelerator pedal, if engine efficiency is unfavorable, in that the accelerator pedal vibrates. Depending on the power requirement to be expected thereafter, the driver is then able to decide and react, practically subconsciously. Moreover, this possibility for action is significant because, according to the invention, automatic upshifting processes are also suppressed in principle if the accelerator pedal is released and the driving speed decreases or remains the same. Downshifting processes are initiated only if the accelerator pedal travel exceeds a force threshold.

During the acceleration phases and during uphill travel, the driver's accelerator pedal movements are influenced, on the one hand, by the force threshold that becomes effective along the path of the accelerator pedal, with such force threshold being program controlled to always be associated with that throttle or control rod position which lies at the consumption optimum of the engine characteristics for the respective number of engine revolutions; per minute on the other hand, haptic signals are actuated by the program to become discernible to the driver from case to case to signal to him an unfavorable specific fuel consumption due to a power demand that is too low. If the developing traffic conditions and driving situation make it appear to be prudent, the driver will then react to these haptic signals and initiate an upshifting process, for example by means of a small movement of the pedal, or an automatic disengagement of the clutch and thus an idling phase by releasing the accelerator pedal to its zero position.

For driving phases at constant speed, a shift of the range of greatest frequency in operation within the engine characteristics can be realized only by an appropriate number of gears and, particularly in passenger automobiles, by a great overdrive spread. Without special measures, however, the frequency of gear changes would then rise to unacceptable values. Therefore, for certain pedal movements, the invention provides a program controlled suppression of gear shifting processes which in prior art automatic transmissions are actuated along the customary adaptive gear shifting curve. This applies for upshifting processes when the accelerator pedal is released and for downshifting processes when the accelerator pedal is moved in a pedal travel range up to the force threshold. Pedal movements beyond the force threshold permit the initiation of downshifting processes at any time.

In order to fully utilize all opportunities for fuel savings in the other driving phases as well, the clutch is disengaged by the program in all gears on level ground if the accelerator pedal returns to the zero position and thus an idling phase is initiated, while for downhill travel the clutch disengagement process is suppressed by the program and thus the braking effect of the engine and the disconnection of thrust become effective without any influence on the driver's part. However, if the brake pedal is released completely after it has been actuated, the program always disengages the clutch; thus it is possible during downhill travel to accelerate the vehicle from case to case without using any engine power.

BRIEF DESCRIPTION OF THE DRAWINGS

The invention will now be described in greater detail for preferred embodiments thereof to which it is, however, not limited, and with reference to the drawing figures in which.

DESCRIPTION OF A PREFERRED EMBODIMENT

Figure 1:
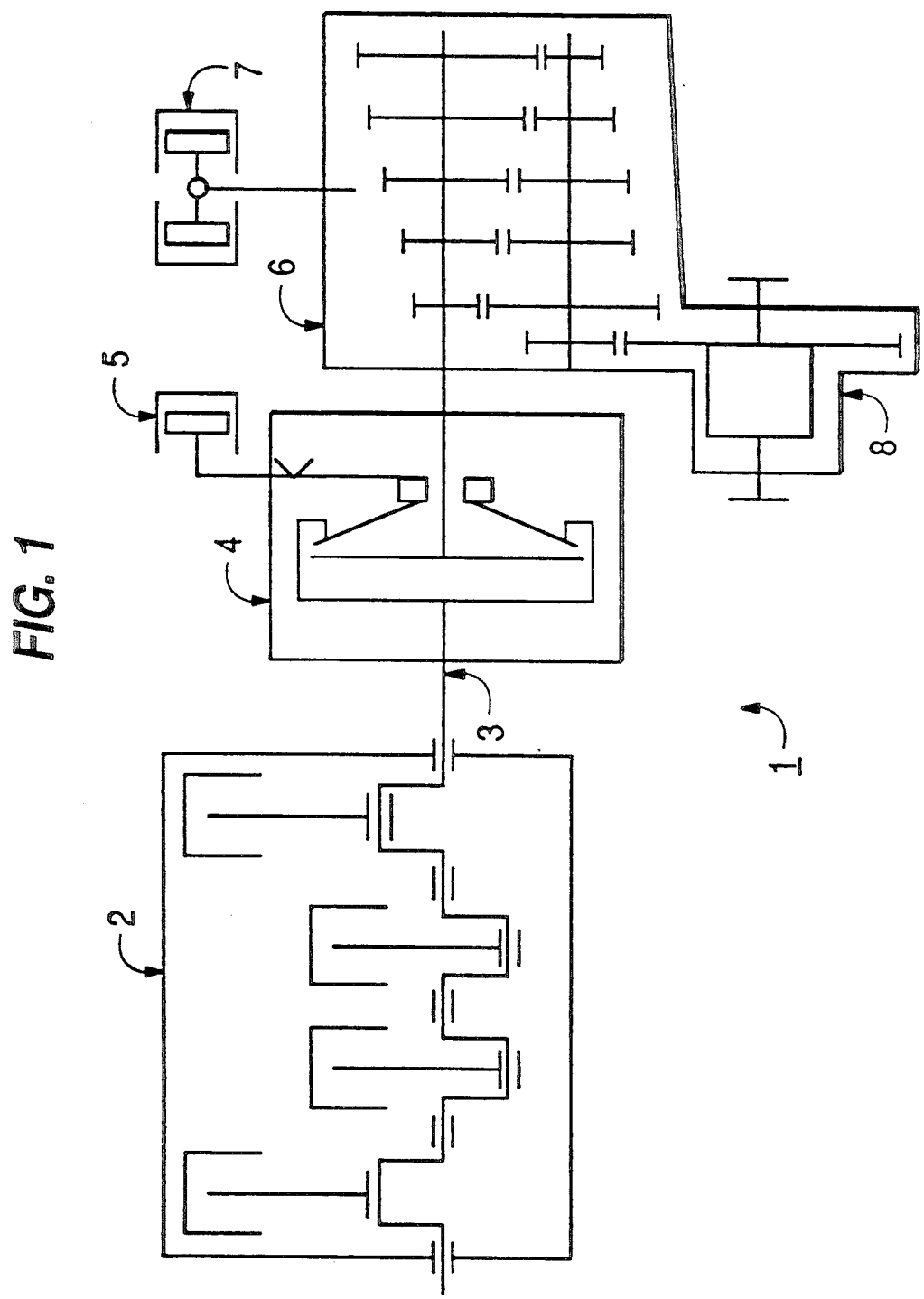
FIG. 1, is a schematic representation of the drive train of a motor vehicle.

FIG. 1 is a schematic representation of the drive train 1 of a motor vehicle. This drive train 1 includes an internal combustion engine, i.e. an engine 2, whose crankshaft 3 is connected with a clutch 4 which, in the present case, is automatically actuated by way of a pneumatic servo drive 5. On the driven side, clutch 4 is followed by an automatic transmission 6 which has an associated pneumatic servo actuator or device 7 and by means of which the torque is transmitted by way of a differential gear 8 to motor vehicle wheels (not shown).

This basic drive train configuration including, for example, pneumatic servo device 5 for actuation of the clutch and pneumatic servo device 7 for shifting gears is conventional per se and thus need not be described in further detail.

Figure 2:
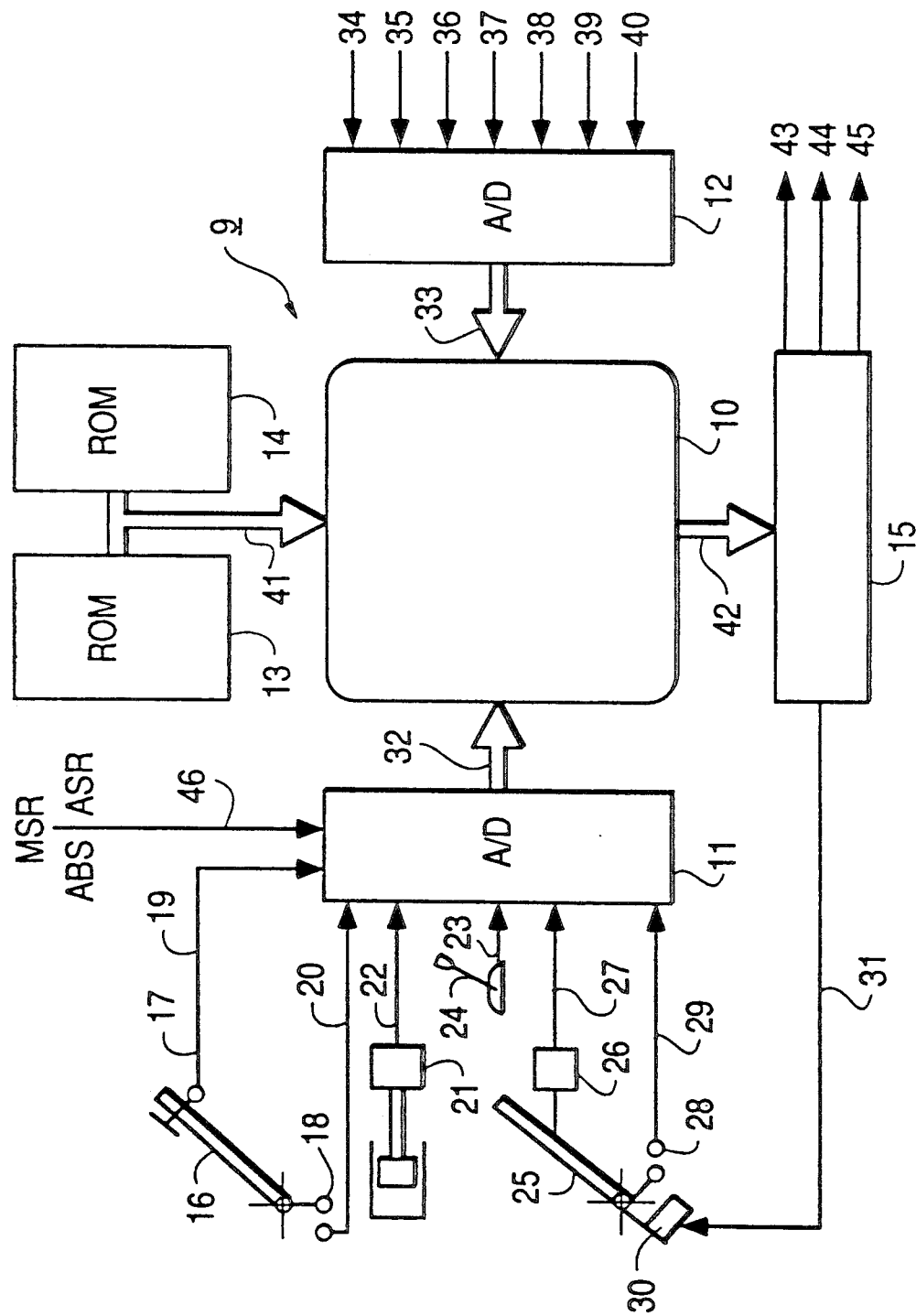
FIG. 2, is a schematic illustration, in part as a block circuit diagram, of a device for controlling such a drive train in a motor vehicle.
Figure 10:
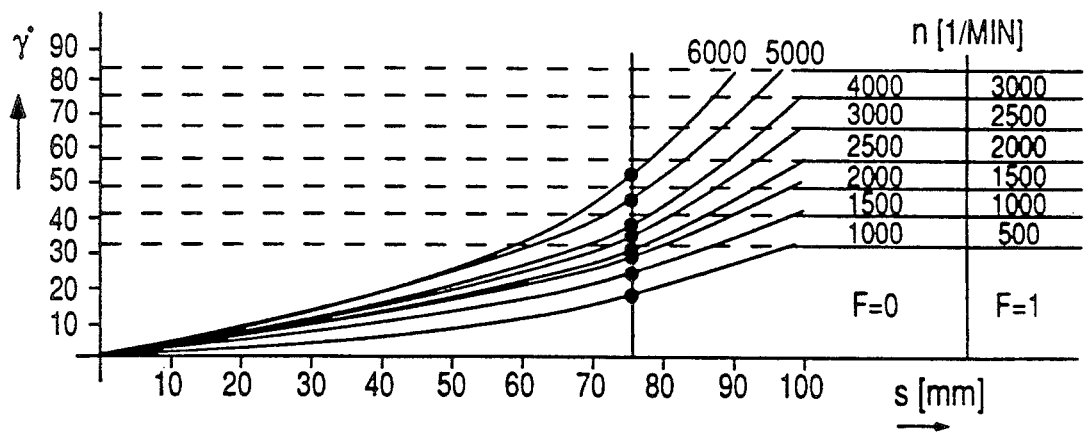
FIG. 10, is a diagram illustrating an example for vehicle specific, rpm dependent throttle characteristics.

FIG. 2 is a schematic representation of a processor control unit, generally designated 9 for automatically controlling such drive train 1 (FIG. 1), with connecting lines to sensors and actuating drives as well as a brake pedal and an accelerator pedal being illustrated schematically; all of these components are conventional per se and are therefore not illustrated in detail). Shown in detail is a processor control unit 9 including a microprocessor 10 whose input is connected with analog/digital converters 11, 12 and is additionally connected with memories 13, 14, preferably ROM's. The one ROM, e.g. 13, holds vehicle specific data, i.e. parameters and characteristic values, namely particularly the so-called engine characteristics, as well as throttle characteristics (for example as shown in FIG. 10 and as to be described in greater detail below), while the other ROM 14 holds fixed program modules for the automatic control sequences to be described below (for example, according to the flow charts of FIGS. 4, 6, 8 and 12). The output of microprocessor 10 is connected with an electronic power output circuit 15 which accomplishes the various actuations to be described below.

A/D converters 11, 12 convert to digital form the various analog signals coming from sensors associated with individual vehicle components, with these signals being correspondingly prepared for processing in microprocessor 10 as it is known per se so that it need not be described here.

In detail, A/D converter 11 is connected by way of signal lines 19 and 20, respectively, with a brake pedal response or contact sensor 17 associated with the brake pedal 16 of the motor vehicle and with a safety sensor 18 likewise associated with this brake pedal 16 which picks up the completely depressed state of brake pedal 16. Moreover, A/D converter 11 is connected by way of a signal line 22 with a brake pressure sensor 21. Via a line 23, A/D converter 11 also receives a signal from a shift lever 24 with which certain shifting measures can be taken in a conventional manner, for example, to start driving or to drive in reverse.

FIG. 2 additionally shows an accelerator pedal 25 whose function as a power control member for electronically controlling the engine power is known per se. The position of accelerator pedal 25 is continuously monitored by a sensor 26, the power reference value generator, and a corresponding signal is applied by this reference value generator 26 via a line 27 to a further input of A/D converter 11. For safety reasons, a sensor 28 is also provided which detects the zero or idling position of accelerator pedal 25 and applies via a line 29 a corresponding zero position signal to A/D converter 11.

Accelerator pedal 25 further has an associated electromechanical drive 30 which is able to apply a haptic signal to accelerator pedal 25 and which is preferably configured as a vibrator. This drive, i.e. vibrator 30, is actuated by way of a line 31 coming from output circuit 15 of microprocessor 10, as will be described in greater detail below with reference to FIGS. 9, 10 and 12.

From A/D converter 11, the digitalized, processed signals travel via a bus 32 to microprocessor 10. In a similar manner, signals digitalized by A/D converter 12 travel to microprocessor 10 via a bus 33. In detail, these are signals coming from conventional sensors, feelers, etc. (not shown), for example, as follows:

signal line 34 - number of engine revolutions n;
signal line 35 - driving speed v;
signal line 36 - gear identification G;
signal line 37 - engine temperature T;
signal line 38 - brake temperature;
signal line 39 - clutch displacement pickup;
signal line 40 - throttle displacement pickup.

In microprocessor 10, the applied signals are processed by the programs stored in ROM 14 employing the vehicle specific and engine specific characteristics and parameters stored in ROM 13, with the corresponding data and programs being transmitted to the microprocessor via a bus 41. The resulting signals thus obtained in computer 10 are then transmitted via a bus 42 to output circuit 15 from where they actuate, after being appropriately amplified, which is not shown in detail in FIG. 2, for example, a throttle adjuster (signal line 43), a clutch servo motor (e.g. servo drive 5 of FIG. 1), or pneumatic valves for actuating the clutch (signal line 44) and the gear shift control, for example servo drive 7 of FIG. 1 (signal line 45) and, if required, the already mentioned accelerator pedal vibrator 30 (signal line 31).

Finally, for the sake of completeness, FIG. 2 shows quite schematically a signal line 46 for signals from an anti-lock braking system (ABS), an anti-slip control (ASR) and an engine slip control with this signal line 46 leading to A/D converter 11.

Figure 3:
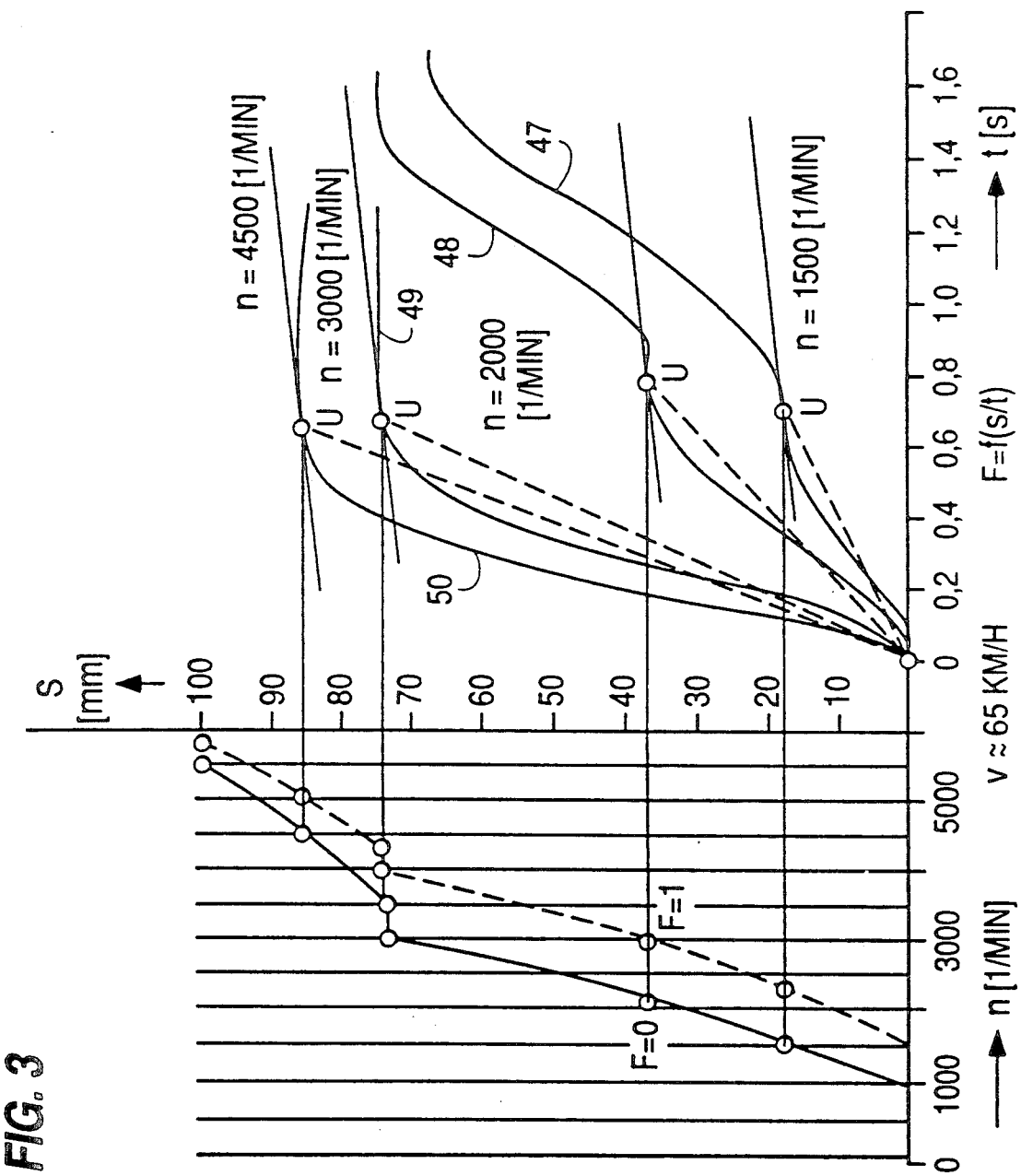
FIG. 3, is a diagram showing the relationships during an accelerator pedal motion sequence, in which the accelerator pedal is moved from the zero position into a first, at least approximate rest position.
Figure 5:
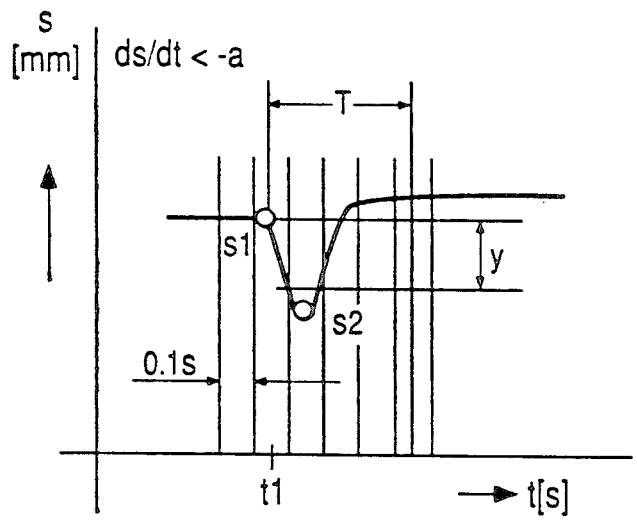
FIG. 5, is another diagram of an accelerator pedal motion sequence with which it is possible to arbitrarily initiate an upshifting process.
Figure 7:
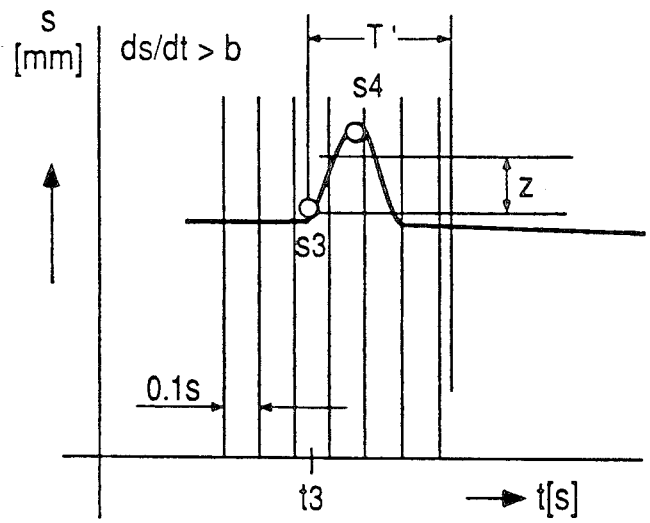
FIG. 7, is a diagram similar to that of FIG. 5 showing, however, the motion sequence for arbitrary initiation of a downshifting process.

In the present case, control unit 9 and its compute 10 are not only designed to perform, in a conventional manner, the actuation of the transmission and of the clutch on the basis of the stored characteristics and parameters, but also to selectively pick up the movements of accelerator pedal 25 and, if applicable, of brake pedal 16, i.e. to cause certain control processes to be initiated if certain motion sequences occur. FIGS. 3, 5 and 7 are diagrams illustrating examples of such concrete accelerator pedal motion sequences, with these concrete motion sequences being detected as arbitrary driver requests by microprocessor 10 during its selective pickup and being processes as instruction signals as will be described in greater detail below.

FIG. 3 shows schematically, in a combined diagram, the determination of the engine rpm's at which gear shifting takes place for a motion sequence of accelerator pedal 25 (FIG. 2) in which accelerator pedal 25 is moved from a zero position 0 (into which it had previously been moved) into a first, approximate rest position U. The right half of the diagram of FIG. 3 here shows the path s of accelerator pedal 25 over time t, with four examples being illustrated for movement of the accelerator pedal from zero position 0 into the first, approximate rest position U. This motion sequence, i.e. movement of the accelerator pedal back into the zero position and then into a first position, approximately equal to rest position U will generally take place with the vehicle rolling. However, it is also possible to determine the number of engine revolutions per minute at which gear shifting is to take place during the initial acceleration of a start-up process as a function of such a first actuation of the accelerator pedal. The first, at least approximate rest position U of the accelerator pedal is given in that the velocity of the accelerator pedal movement, ds/dt, reaches a certain predetermined value or parameter x stored in ROM 13 or falls below this value x. The position s of the accelerator pedal, at which the velocity of the movement of the accelerator pedal becomes smaller than the value x, i.e. abs (ds/dt)<x, is here picked up and, according to stored characteristics for which examples ar given in the left half of the diagram of FIG. 3, this position is associated with a certain number of engine revolutions per second n. Such characteristic curves s/n may be stored for various driving modes or driving parameters F. In the present embodiment, two curves are shown for two driving mode parameters, F=0 (for a consumption optimized driving mode) and F=1 (for a power oriented driving mode, dashed curve in FIG. 3). However, several curves may also be provided to correspond to several driving mode parameters. In particular, it is also possible in this connection to have control unit 9 itself determine the driving mode parameter following every zero position of accelerator pedal 25 in that the average velocity of the movement of accelerator pedal 25 from the zero position 0 into the first rest position U is calculated and compared with a predetermined value.

FIG. 3 shows this dependence of driving mode parameter F in that F is given as a function of s/t. In the time period from zero position 0 to rest position point U, the point at which the velocity of the accelerator pedal movement changes from ds/dt>x to ds/dt<x (this is the reason for point U hereinafter also being referred to as the changeover point), gear shift clutch 4 is inactive, i.e. the clutch is disengaged during this period of time, and all control signals for controlling the gears and the throttle are suppressed during this time. However, it is preferred that already during the movement of the accelerator pedal from 0 to U the number of engine revolutions per minute n associated with the respective accelerator pedal position s is continuously approached in dependence on driving mode parameter F - but this associated engine speed is approached no later than at time U, and then the associated gear is determined in dependence on the momentary vehicle speed v (e.g. about 65 km/h according to FIG. 3) and the shifting and clutch engaging process is initiated which then takes place automatically and in a known manner. For example, in this process, the lowermost motion curve 47 of FIG. 3 results initially in a driving mode parameter F=0 for consumption optimized driving due to the slow velocity with which the accelerator pedal is moved from position 0 into position U and then, according to the resulting accelerator pedal position s (≈17 mm), the associated number of revolutions n=1500 1/min is determined from the characteristics (left half of the diagram of FIG. 3); depending on the momentary vehicle speed v (≈65 km/h), the associated gear, in the present example the fifth gear, is then determined, whereupon the shifting and clutch engaging process takes place automatically; thereafter, the engine power is controlled again in the conventional manner by the position of the throttle (or the control rod) in primary dependence on the position s of the accelerator pedal.

FIG. 3 then shows, as further pedal movement curves 48, 49 and 50, other possibilities: for curve 48 a number of engine revolutions of n=2000 1/min results at point U, according to which fourth gear is determined, while a number of engine revolutions of n=3000 1/min and third gear are associated with curve 49 at point U and a number of engine revolutions of n=4500 1/min and second gear are associated with curve 50 at point U.

The predetermined velocity value x for a determination of the first, at least approximate rest position is selected in dependence on the vehicle and the engine and is stored in ROM13 as a fixed parameter; in the present embodiment, this value x may be, for example, 5 mm/s. It will certainly also be decisive for a determination of this value x to which degree shocks to which the vehicle is subjected could lead to a superposition of inadvertent movements on the intentional movement of the accelerator pedal from zero position 0 into rest position U.

Figure 4:
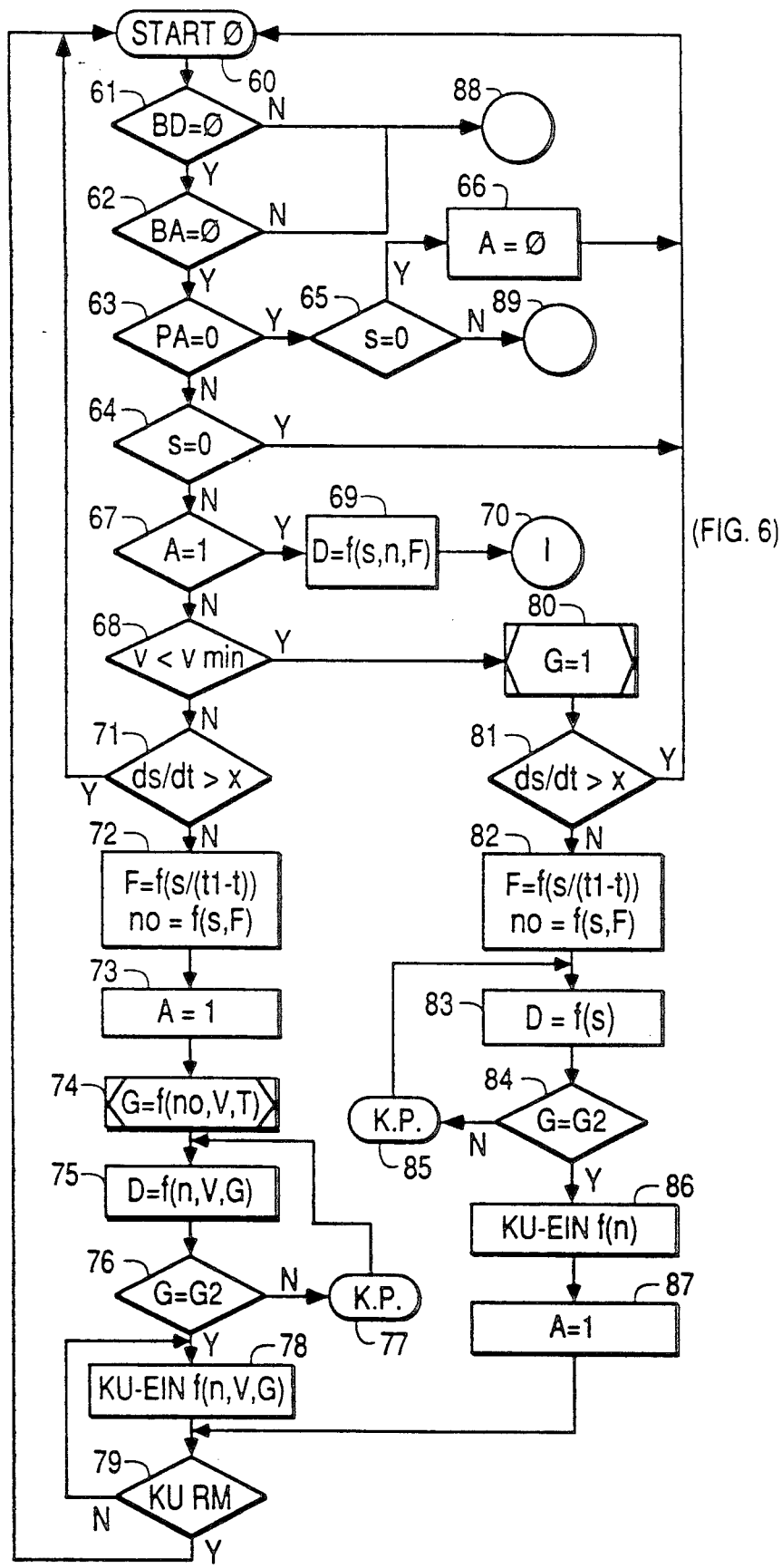
FIG. 4, is a flow chart for an associated program module, illustrating the individual steps for a control process corresponding to the motion sequence of FIG. 3.

The flow chart shown in FIG. 4 will now serve to describe the example of the process of selective pickup of such a motion sequence as shown in FIG. 3, i.e. a movement of accelerator pedal 25 from zero position 0 into the first, at least approximate rest position U. The associated program, i.e. a program module (program 0) for this purpose, is stored in the memory shown in FIG. 2, e.g. ROM 14, and this program module is cyclically called up and processed by microprocessor 10, e.g. at intervals of tenths of a second.

According to FIG. 4, after a starting and initializing step 60, the first query is made (block 61) as to whether there is no brake pedal actuation (sensor 17 and 21, respectively, in FIG. 1) (BD=0?). If no brake pedal actuation is reported, a query is made for safety reasons in block 62, as to whether no signal from brake pedal bottom stop (sensor 18 in FIG. 2) is present (BA=0?). If the answer is "yes" (designated by path J) again, i.e. no brake pedal bottom stop contact has been reported, a query is made in block 63 as to whether the accelerator pedal has not been actuated (PA=0?). If the result of this query is negative (designated by path N), i.e. the accelerator pedal has been actuated, the program continues by inquiring about the path traversed by the accelerator pedal s=0? (sensor 28 in FIG. 1) according to block 64, as will be described below.

If during query 63 no accelerator pedal actuation has been determined, a query is again made - in block 65 - as to whether the pedal travel is s=0 and if so, a parameter A for gear shifting is set to equal 0 in block 66 (in which case the clutch is disengaged when there is no downhill grade) and the system returns to starting step 60. Setting A to zero means that no gear has been defined at present.

If the result of the query in block 64 as to whether the path s of the accelerator pedal equals 0 is answered in the affirmative, i.e. no travel of the accelerator pedal has been detected, the system returns to starting step 60; if the result of the query is negative, i.e. travel of the accelerator pedal has been noted, a query is made in block 67 as to whether a gear has been defined already (A=1?). If this is not the case, a query is then made in block 68 as to whether the momentary vehicle speed lies below a predetermined, stored minimum speed v min. If, however A=1, a signal for the positioning of the throttle or control rod (signal D) is defined in block 69 as a function of pedal travel s, number of engine revolutions per minute n and driving mode parameter F. This is followed by a subprogram I at 70. This subprogram I will be described in greater detail below with reference to FIG. 6.

If it results from the query according to block 68 in FIG. 4, that the vehicle speed v does not lie below the predetermined minimum speed value v min, a query is made in block 71, whether the pedal movement velocity ds/dt is greater than the predetermined value x. As long as this is so, the path of movement of the accelerator pedal still lies between points 0 and U of FIG. 3, and the system returns to the start of program 0, i.e. to starting step 60 and the above-described program steps and queries are repeated. As soon as ds/dt changes over, i.e. becomes less than x, the program reverts to the step of block 72; in this block 72, the driving mode parameter F is determined as a function of the average accelerator pedal movement velocity s/(t1−t) and following it the engine speed range n0 is determined as a function of accelerator pedal travel s and/or driving mode parameter F. Driving mode parameter F is here determined, for example, by dividing the accelerator pedal travel s at point U of FIG. 3 by the time expired so far, t1−t.

Then in step 73, the parameter A for gear identification is set to equal 1 and, on the basis of the fact that the accelerator pedal has been determined to be in the rest position at point U (step 71) and the associated number of engine revolutions per minute is n0, a gear is defined in step 74, in additional dependence upon the vehicle speed v. In this connection, a check is also made in step 74 whether the resulting number of engine revolutions lies above the technical minimum number of revolutions defined for the momentary engine temperature T and the required engine torque. Then, in block 75, the engine torque i.e. the position of the throttle or the control rod, is controlled during the shifting process corresponding to the gear into which a shift is to be made, (gear identification G), the momentary vehicle speed v and the number of engine revolutions per minute n. Then a query is made at 76 as to whether a report has come in that the shifting process has been completed. If not, i.e., if the answer is "no," N, the clutch remains disengaged according to step 77 and the system returns to block 75. If the report that the shifting process is completed is present, however, the program moves to block 77 according to which the clutch engaging process is controlled in the conventional manner as a function of the number of engine revolutions per minute n, the vehicle speed v and the gear G. Then a query is made in step 79 as to whether a report of the completed clutch engaging process is present. If not, the system returns to block 78; if, however, this end-of-clutchengagement report has been received, the system returns to starting step 60. The shifting process as a result of the motion sequence according to FIG. 3 (which had been selectively picked up as an arbitrary direct request for a gear selection from the driver) is thus completed.

If the inquiry according to block 68 indicated that the momentary vehicle speed v lies below the predetermined minimum speed v min, the first gear, i.e. the start-up gear, is determined as the new gear in block 80 and a shifting process is initiated. Then, a query is made in block 81, similarly to block 71, as to whether the velocity of the accelerator pedal movement is still greater than the predetermined value x and as long as this is so, the system returns to starting step 60. As soon as the accelerator pedal movement velocity ds/dt becomes smaller than x, the driving mode parameter (e.g. F=0 for consumption optimized driving and F=1 for power oriented driving) is determined in block 82 as a function of the average velocity at which the accelerator pedal was moved from point 0 to point U of FIG. 3 and so is the number of engine revolutions per minute n0 as a function of accelerator pedal position s and of driving mode parameter F. Then, in step 83, the engine torque during start-up is controlled, e.g. as a function of the accelerator pedal position s and/or the driving mode parameter F. Then, in block 84 a query is made as to whether a report of the gear employed is present (G=G2). If not, the clutch is kept disengaged again in 85 and the system returns to step 83. If, however, this report for a gear employed is present, the clutch engagement process is again controlled according to block 86 as a function of the number of revolutions similarly to step 78. Then, in block 87, parameter A is set to 1, since now a gear has been defined. Finally, in block 79, as already explained above, another query is made as to whether the clutch engagement process has been completed and the corresponding report is present, whereupon the system returns to starting step 60.

As is already evident from the above explanations, the program sequence according to FIG. 4 is a general program sequence in which certain queries regarding brake pedal actuation and accelerator pedal actuation are made with priority and thereafter detailed or subprograms are run. As already described, a subprogram I may here be run at 70 in dependence on the results of the queries. This is illustrated in a flow chart in FIG. 6 which refers to the selective pickup of a concrete motion sequence for accelerator pedal movement as shown in FIG. 5. This concrete motion sequence illustrated in FIG. 5 serves to detect the driver's request for arbitrary upshifting and accordingly pick up a direct gear shifting instruction signal from the driver.

Other subprograms, not to be described in greater detail here, which are started by program 0 of FIG. 4, are illustrated in FIG. 4 at 88 (if brake pedal movement has been detected) and 89 (if no brake pedal actuation has been detected and contradictory accelerator pedal actuations have been reported). These may be safety programs in which, for example at 88, downshifting processes are initiated upon the determination of downhill travel or at high speeds with high brake temperatures.

FIG. 5 shows in diagrammatic form the travel s of the accelerator pedal over the time t for a further concrete, predetermined motion sequence, namely a short-stroke, short-term motion of the accelerator pedal back and forward again: such a release movement of the accelerator pedal is determined by the program module to be a request for upshifting from the driver and, independently of the momentary accelerator pedal position and engine power requirement, the upshifting process is initiated after a calculation has been made of the technical permissibility of the number of engine revolutions per minute in the new gear.

In this connection, it must be noted that the prior art fully automatic upshifts provided to correspond to shifting curves as they occur in automatic transmissions if the accelerator pedal is released and the vehicle speed drops or remains the same, are suppressed in principle by control unit 9 and the program of the present invention (see also the statements below in connection with FIG. 9). Program controlled, automatic upshifts along adaptive shifting characteristics take place only if either the stored gear specific and adaptive minimum vehicle accelerations are attained or exceeded or if a so-called "Tempomat" is activated which is prior art per se and is here assumed to be known.

FIG. 5 shows how, beginning at a point s1, at time t1, the accelerator pedal 25 (FIG. 2) is suddenly released, thereby exceeding a predetermined minimum distance y, until reversal point s2 is reached, from which the accelerator pedal is moved forward again until after a certain minimum time period T (in the embodiment shown in FIG. 5 earlier already) a more or less stable accelerator pedal position is reached again once the predetermined minimum distance y has been traversed. This process takes place in a range of tenths of a second, for example, in one-half a second, and is, as already mentioned, picked up by the control system as an arbitrary request from the driver to initiate an upshifting process.

Figure 6:
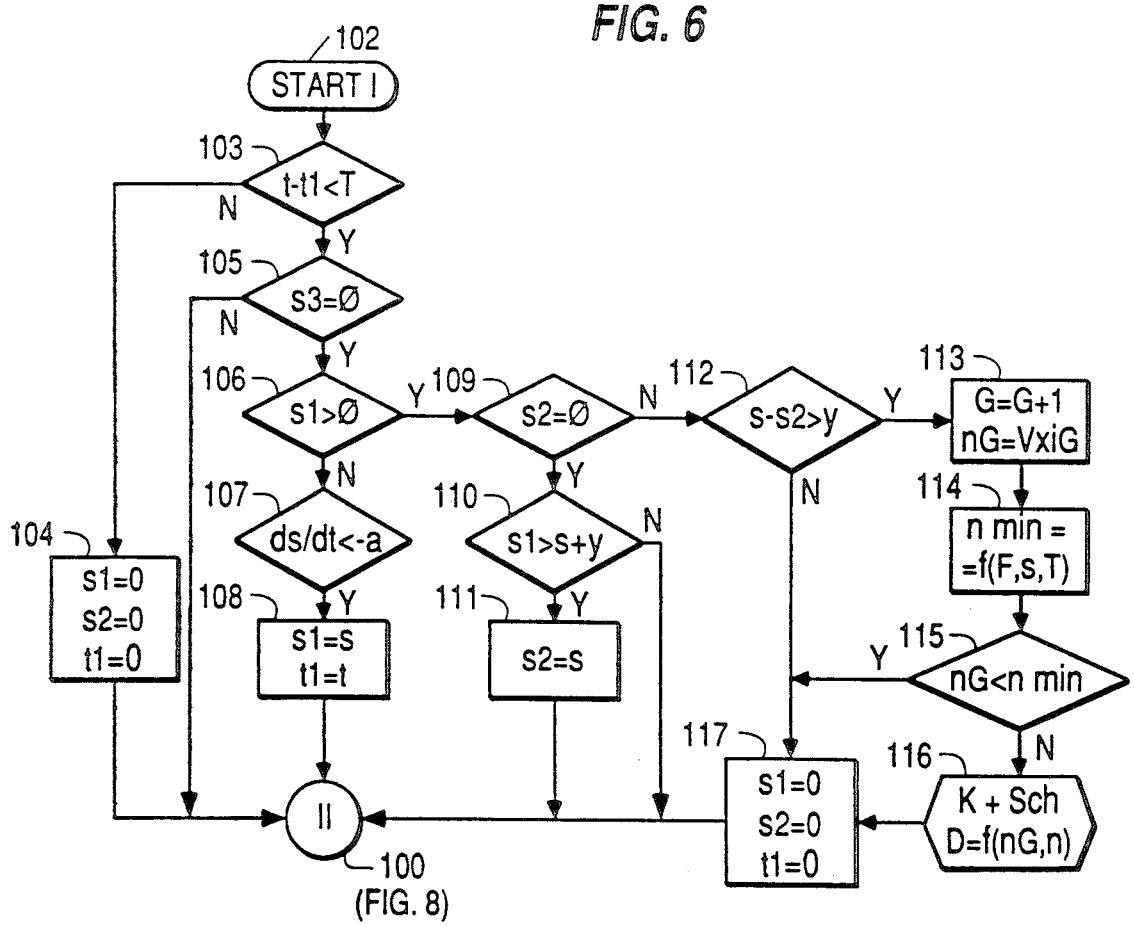
FIG. 6, is the associated flow chart showing the individual steps for the selective pickup of this motion sequence according to FIG. 5 until the upshifting process is initiated.
Figure 8:
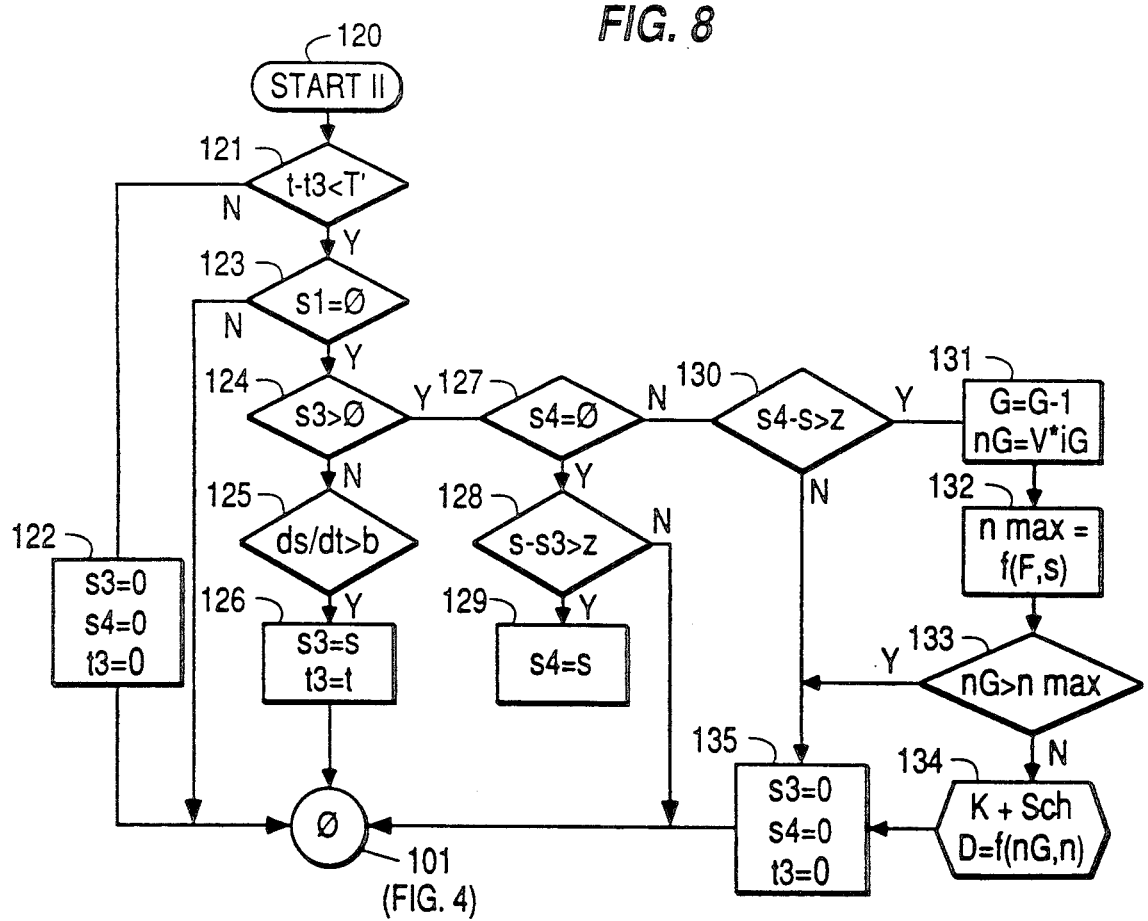
FIG. 8, is a flow chart for FIG. 7 in the manner corresponding to FIG. 6.

The associated flow chart is shown, as already mentioned, in FIG. 6, with it being necessary to mention additionally that a subprogram II to this program module I is called up, according to FIG. 6, at 100 and the called-up subprogram II is the program which is shown in the flow chart of FIG. 8 and includes in detail the program steps for the case of an accelerator pedal motion sequence to initiate a downshifting process. From this subprogram II according to FIG. 8, the system then returns - at 101 - to the main program 0 of FIG. 4. As a modification, after step 101, before the system returns to the main program of FIG. 4, a further subprogram may be called up, i.e. the program (III) shown in FIG. 12, which will be described below.

According to FIG. 6, starting step 102 is followed by a query in block 103 as to whether the predetermined time interval T (see also FIG. 5) has not yet been exceeded, i.e. whether $(t-t1)<T$. If this is not the case, i.e. time barrier T has already been passed, $s1=0$, $s2=0$ and $t1=0$ are set in step 104 and the already mentioned program module II of FIG. 8 is started at 100. If, however, time barrier T has not yet been passed, i.e. $(t-t1)<T$, a query is made at 105 of FIG. 6 whether a value for point s3 (according to FIGS. 7 and 8, respectively) is still stored. If not, the system again changes to program module II of FIG. 8 at 100. Otherwise, a query is made in step 106 of program module I of FIG. 6, following the previous query, whether a value for s1 has already been stored, i.e. whether $s1>0$. If not, a query is made at 107, as to whether the momentary velocity of the accelerator pedal movement is negative to a sufficient degree, i.e. whether $ds/dt<-a$, where a is a predetermined minimum velocity value. If this minimum velocity value a is not reached, i.e. the velocity of the accelerator pedal is too slow, the system changes to program module II of FIG. 8. In the other case, according to block 108 of FIG. 6, the picked-up momentary value s for the accelerator pedal position is stored as a value for s1, and likewise the associated time t1 is retained so that point s1 of FIG. 5 is now retained as a (possible) starting point for a sudden release to be registered as an upshift request. Then program module II changes back to the main program 0 from where a change is made at 70 back to program module I of FIG. 6.

Since now a value s1>0 is present, the result of the query according to block 106 is positive in contrast to before and accordingly the system moves to another program branch to a query 109 as to whether a value s2 has already been stored. If this is not the case, i.e. if the answer to the question s2=0? is "yes", a query is made in the next program step at 110, as to whether the momentary value s for the accelerator pedal position plus the predetermined minimum distance y is still less than the previously stored value of s1. If this minimum distance y has not yet been exceeded, i.e. s1 is still greater than s−y, program module II and main program 0 begin a new cycle. If the minimum distance y has already been exceeded, step 111 now records the momentary value s for the position of the accelerator pedal as a value for s2. During the next passage of the loop, query 109 will produce a negative result so that now the system continues with query 112 as to whether the minimum distance y was already exceeded during the return movement. As long as this is not the case, the system returns cyclically via program module II to the start of the program. However, as soon as the minimum distance y has been exceeded, the new gear G is determined in block 113 of FIG. 6 as the next higher gear and likewise the number of engine revolutions per minute in the new gear, nG, is calculated. Then, according to block 114, the momentary technical minimum number of engine revolutions per minute, n min, is calculated as a function of F and s and, for example, from the engine temperature T and the throttle position or is obtained from characteristics stored for this purpose. Then a query is made at 115, as to whether the number of engine revolutions per minute nG in the new gear is lower than the technical minimum number of revolutions per minute n min; if this is not true, the clutch actuation and the shifting process for a change to a new gear are initiated in a step 116, with the engine power being controlled accordingly during the shifting process with the aid of the throttle in dependence on the new gear nG and the number of revolutions per minute n (D=F(nG, n)). Then, or in case the number of engine revolutions falls below the technical minimum number of revolutions in the new gear, values S1, S2 and t1 are all set to equal 0 (block 117) and a change is made to program module II (at 100).

In a quite similar manner, according to FIG. 7, a short movement stroke of the accelerator pedal forward and back beyond a certain minimum distance z is selectively detected as a driver request for downshifting, independently of the number of engine revolutions per minute and the engine torque. Again, in order to determine the beginning of the sudden pedal movement (point s3 at time t3) a check is made whether the velocity with which the accelerator pedal 25 is moved, exceeds a certain predetermined value b. Then the system monitors whether the minimum distance z is exceeded at point s4, the reversal point for the sudden pedal movement, and whether, during the return movement of the accelerator pedal, this minimum distance z is again exceeded; a determination is also made as to whether this sudden movement of the accelerator pedal occurs within a predetermined time interval T'.

The associated program module II is illustrated in FIG. 8, with this program module and this subprogram, as already mentioned, beginning at point 100 in the flow chart according to FIG. 6 with a starting step 120. At 121 a check is then made whether the system is still within the predetermined time interval T', i.e. whether time barrier T' has not yet been exceeded. In the case where it has been exceeded, the values S3=0, s4=0 and t3=0 are set in a block 122 and the system returns to the main program 0 at 101.

If during a subsequent cyclic passage of subprogram II, it is noted that time interval T' has not yet been exceeded, i.e. (t−t3)<T', a query is made at 123, as to whether a value for sl (see FIGS. 5 and 6) has already been stored. If the answer to the question s1=0? is "no", which means that a value S1 has already been stored, the system likewise returns to the main program 0 of FIG. 4 at 101. Otherwise, a query is made in a next step 124 as to whether a value has already been stored for s3. If this is not the case, it is determined in a query 125 whether the velocity of the accelerator pedal movement exceeds the predetermined minimum value b. If this is not the case, subprogram II is terminated again at 101 and the main program 0 begins. If, however, the velocity of the accelerator pedal exceeds value b, the momentary accelerator pedal position value s is stored, according to block 126 of FIG. 8, as a value for s3 and the associated time t is retained for the beginning time t3. Then a new cycle for the program run is begun at 101, i.e. the system returns to the main program 0 of FIG. 4.

During the next run through program module II, the result of the query at step 124 will now be positive and therefore the program will continue over a different branch, with first a query being made at 127 as to whether the value for reversal point s4 is still 0. If yes, a query is made at 128 as to whether, beginning with s3, the length of the movement of the accelerator pedal has already exceeded the predetermined minimum distance z and, as soon as this is the case, the momentary value s is recorded, according to block 129, as the value for reversal point s4 and the system returns to the main program (field 101). If, however, the minimum distance z has not yet been exceeded, a new program cycle is immediately initiated at 101.

After setting s4=s in block 129, the next run through the program will bring a negative result to the query in 127, since now s4 is not equal to zero, and a check is then made at 130 whether the predetermined minimum distance z had already been exceeded during the return movement, i.e. whether (s4−s)>z. As long as this is not the case, the system again returns to the main program 0 of field 101. However, as soon as the minimum distance z has been exceeded, block 131 determines the new gear G (as the next lower gear, G-1) and the number of engine revolutions per minute in the new gear, nG, is calculated. Then, the momentary technical maximum number of engine revolutions per minute is defined in 132 on the basis of parameters (e.g. driving mode parameter F, position s of the accelerator pedal), e.g. also in dependence on the engine temperature. Thereafter, a check is made at 133 whether the number of engine revolutions per minute nG is higher in the new gear than the just defined technical maximum number of revolutions per minute n max. If this is not the case, clutch actuation and shifting into the new gear are initiated (step 134). During the shifting, the engine power is controlled correspondingly by way of the throttle position. If, however, the number of engine revolutions per minute in the new gear is higher than the technical maximum number of revolutions per minute, no shifting takes place and values s3, s4 and t3 are set to equal zero according to block 135, whereupon the system again returns to the main program 0 of FIG. 4 at 101.

The predetermined values for time intervals T and T', for the minimum distances y and z, and for the minimum velocity values a and b mentioned in connection with FIGS. 5 and 6, on the one hand, and FIGS. 7 and 8, on the other hand, may be selected to be different individually, but preferably they are selected to be identical; i.e., T=T', y=z and a=b. These values are again selected in dependence on the vehicle type, engine, etc. and, for example T=T' is approximately 0.4 s, y=z is approximately 0.5 to 1.0 cm and a=b is approximately equal to 20 mm/s.

Thus the driver is able, by way of the accelerator pedal motion sequences shown in FIGS. 5 and 7, respectively, to arbitrarily change gears at any time by a corresponding short back and forth movement of the accelerator pedal. The gear shift is always initiated only after a check has been made as to its appropriateness, i.e. whether the number of engine revolutions is permissible in the new gear. Thus, the driver is able for the first time in connection with an automatic transmission to initiate anticipatory precautionary upshifting or downshifting processes independently of the momentary power requirement, merely by way of the accelerator pedal.

Figure 9:
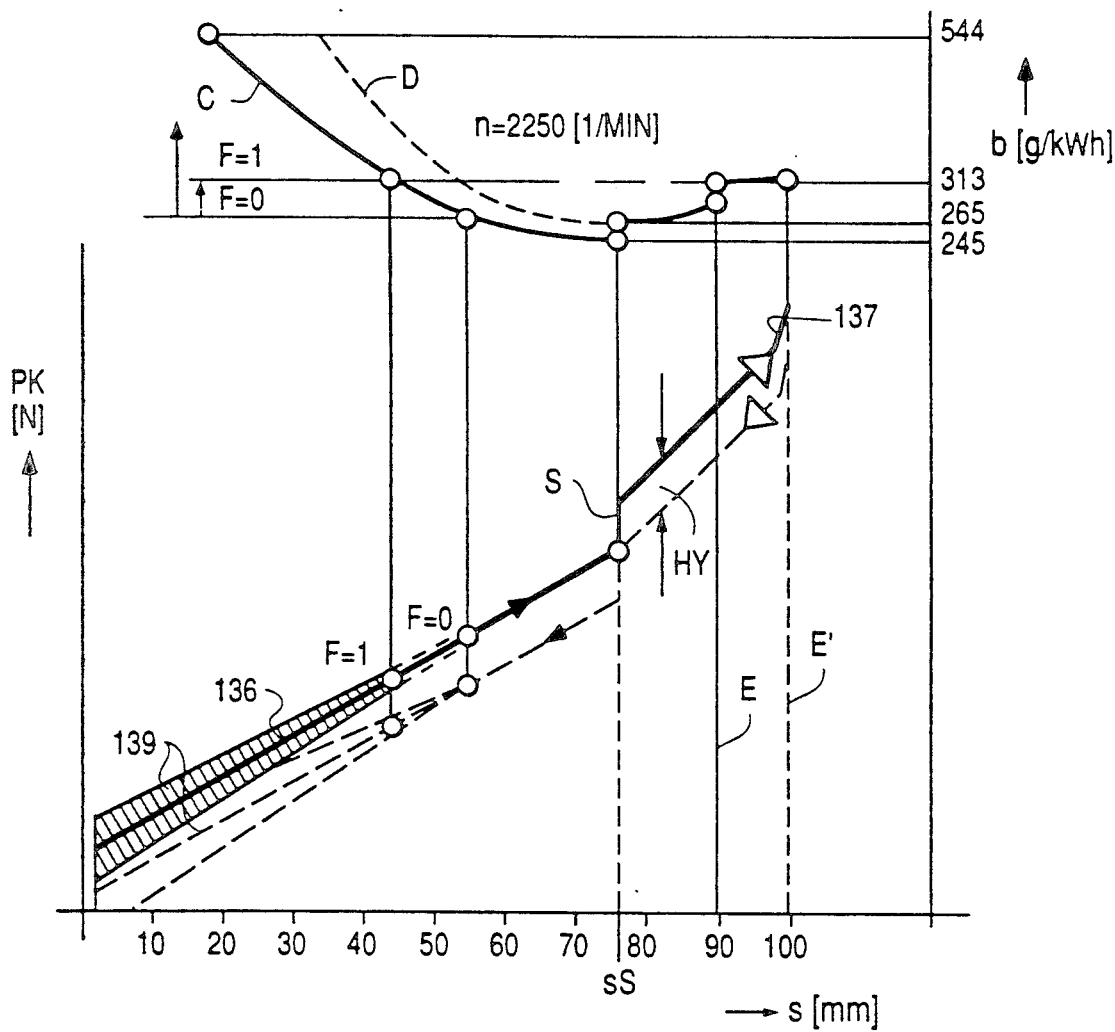
FIG. 9, is a combined diagram showing the pedal force required for the accelerator pedal over the pedal position and including a separate threshold value and, for a certain number of engine revolutions per minute, the increase in specific power consumption when the accelerator pedal is released as well as the effective range of a vibrator for this case.

Customarily the pedal return force in an electronic accelerator pedal intended as a power control member is generated by one or two springs, with a linear increase in the pedal force PK resulting with increasing pedal travel s, as illustrated at 136 in the diagram of FIG. 9. Moreover, a force hysteresis to stabilize the pedal force is generated by means of a friction disc. As shown in FIG. 9 at 137, for example, a device for a high increase in pedal force, a force threshold for the so-called kickdown, is provided near the point of full load.

In the present embodiment, an additional force threshold is installed, according to FIG. 9, approximately at the beginning of the last quarter of the accelerator pedal travel, i.e. the required pedal force curve is stepped at this point of the force threshold and then increases more steeply. This is realized, for example, by an additional spring which becomes effective beginning with this accelerator pedal position. This force threshold is shown schematically at S in FIG. 9. The hysteresis existing during the forward and return movement of the accelerator pedal is also shown schematically in FIG. 9 by the letters HY, with the forward movement being shown in solid lines and the return movement in a dashed line.

Figure 11:
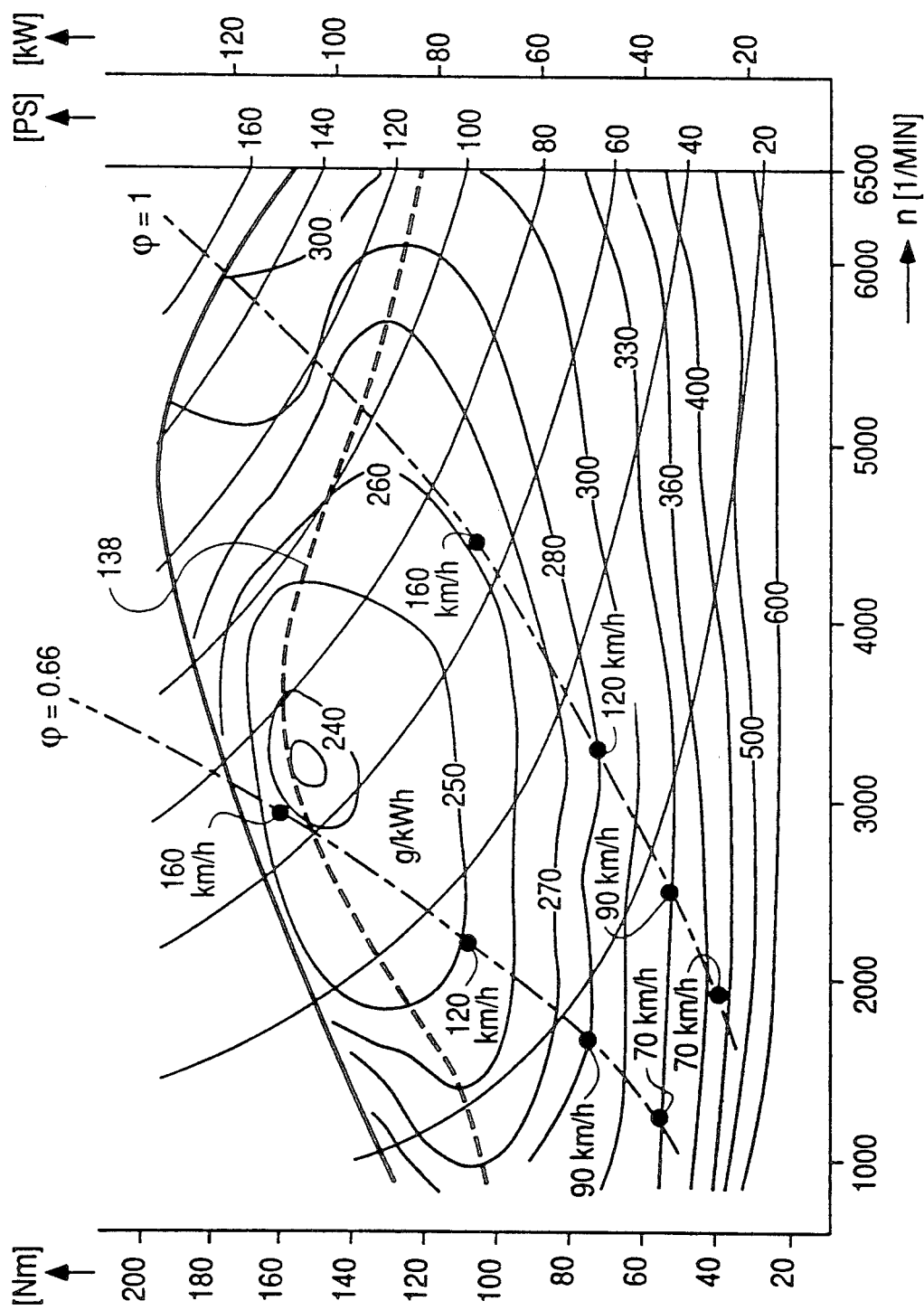
FIG. 11, is an example of conventional engine characteristics for a known 2-liter, 16-valve engine, with the fuel savings potential being evidenced by a great overdrive spread ($\psi = 0.66$)

When the accelerator pedal moves toward force threshold S and stops at force threshold S, the present control ensures driving with optimum engine efficiency. For this purpose, vehicle specific rpm dependent throttle characteristics as shown in FIG. 10 are stored in ROM 13, with these throttle characteristics being designed in such a manner that the position of the accelerator pedal at force threshold S with a driving mode parameter F=0 (for a consumption optimized driving mode) always has that throttle position associated with it which produces the optimum specific fuel consumption (corresponding to the dashed line 138 in the engine characteristics of FIG. 11 which are also stored in ROM 13) at the momentary number of engine revolutions per minute. With accelerator pedal positions up to force threshold S, the control and the respective program in ROM 14 suppress downshifts as long as the engine revolutions do not fall below a technical minimum number; this technical minimum number of engine revolutions per minute may be determined as a function of parameters, such as, for example, the engine temperature T.

The upper portion of the diagram of FIG. 9 further shows, in a solid line C, the rise in specific fuel consumption b (in g/kWh) for a certain number of engine revolutions per minute, e.g. n=2250 1/min, if accelerator pedal 25 is released without hysteresis and, in a dashed line D, the rise of the specific fuel consumption b with hysteresis. It can here fuel consumption b is in effect. At force threshold S, for example for a driving mode parameter F=0, the accelerator pedal position sS corresponds to a number of engine revolutions of n=3000 1/min and, for a driving mode parameter F=1, to a number of engine revolutions of n=3500 1/min.

Actuation of the accelerator pedal beyond this force threshold S causes continuously rising numbers of engine revolutions to be associated with the accelerator pedal positions for the automatic downshifting processes, as shown in FIG. 9, with these minimum rpm's being stored in ROM 13 and possibly again being dependent on the driving mode parameter F. For example, for a power oriented driving mode (driving mode parameter F=1) and with the accelerator pedal depressed as far as possible, they approximately correspond to the rpm for maximum power. In detail FIG. 9 shows, for example, that a position indicated by line E corresponds to a number of engine revolutions per minute of n=4000 for F=0 and to a number of engine revolutions of n=4500 for F=1, and the accelerator pedal depressed as far as possible according to line E' corresponds to a number of engine revolutions per minute of n=5000 for F=0 and to a number of engine revolutions per minute of n=5500 1/min for F=1.

If, on the other hand, the driver takes the accelerator pedal further and further away from threshold S because the power requirement continues to decrease, for example during downhill travel, the engine, as already mentioned, reaches ranges of increasing specific fuel consumption b, i.e. decreasing engine efficiency. In the present control system, in which generally upshifting does not occur automatically when the accelerator pedal is released, this is to be signaled to the driver by the application of a haptic signal, e.g. in the form of vibrations 139, to accelerator pedal 25, with for example, the vibrator 30 shown in FIG. 2 being provided for this purpose which is then actuated by microprocessor 10 via its output circuit 15. The vibrations 139 begin to appear at accelerator pedal 25 with a delay which may be selected in dependence on the driving mode parameter F. For example, in the case of a driving mode parameter F=0 for consumption oriented driving, the vibrations begin earlier than in the case of driving mode parameter F=1 for power oriented driving. In this connection, it is also advisable for the intensity of the vibrations to increase with decreasing engine efficiency as this is indicated schematically in FIG. 9 by the hatched regions representing these vibrations 139.

However, this initiation of vibrations is advisably suppressed by the control system in cases in which the highest gear has already been employed or if, in the next higher gear, the minimum number of revolutions associated with the momentary throttle opening is not attained.

Instead of a spring, force threshold S may also be provided in the form of an electromotive actuator controlled by microprocessor 10, in which case it is possible to shift force threshold S along accelerator pedal path s. In this case, the throttle openings or control rod positions are associated with the accelerator pedal positions not or practically not in dependence on the number of engine revolutions per minute. Rather, the electromotive actuator determines the force threshold along accelerator pedal path s on the basis of its actuation by the microprocessor wherever, for example for driving mode parameter F=0 (i.e. in the consumption optimized driving mode), optimum engine efficiency is realized at the respective number of engine revolutions per minute. Such an actuator may be combined, for example, with the electromechanical drive 30 of FIG. 2. Or, in order to avoid possible interference, it may be provided as a separate component that is coupled with accelerator pedal 25. For the sake of clarity, however, this is not shown in the drawing. FIG. 2. On the other hand, moreover, the electromechanical drive, i.e. vibrator 30, could also be integrated in pedal reference value generator 26 which is associated with accelerator pedal 25.

Figure 12:
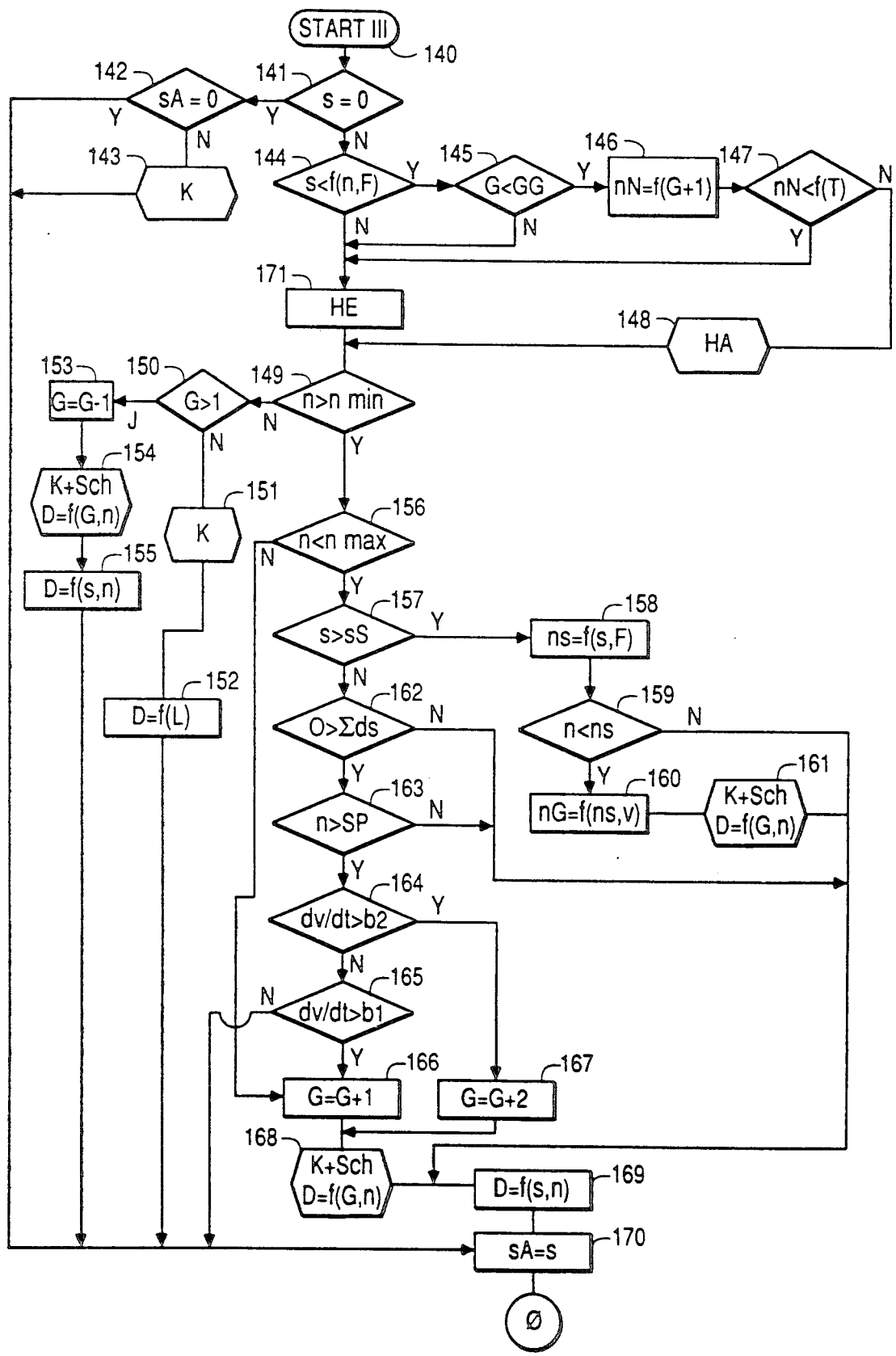
FIG. 12, is a flow chart for a program module for the selective pickup of an accelerator pedal motion sequence upon actuation of the accelerator pedal up to the threshold of FIG. 9 and for actuating a vibrator associated with the accelerator pedal.

FIG. 12 shows, in the form of a flow chart, a program module III with which accelerator pedal movements according to FIG. 9, particularly holding of the accelerator pedal at threshold value 140, can be picked up and with which furthermore vibrations can be applied to the accelerator pedal as haptic signals 139 with a time delay when accelerator pedal 25 is released in order to thus signal the driver that the engine is entering ranges of increasing specific fuel consumption. As already mentioned, subprogram III may here be run following step 101 of FIG. 8, before the system returns to main program 0 of FIG. 4 (see also the end of the flow chart of FIG. 12).

According to FIG. 12, subprogram III makes a query in 141 a step, after a starting step 140, as to whether the pedal travel s=0. If yes, a query is then made at 142 as to whether a previous pedal travel s from a previous program run is still stored as the last value sA (sA=0?). If this is not the case, block 143 terminates a haptic signal which is possibly still present from before and, unless the vehicle is on a downhill stretch, the clutch is disengaged; then the system moves to step 170 which will be described below. If, however, pedal travel value sA=0, the system immediately advances to step 170.

If the result of the query in 141 is negative, i.e. the pedal travel s≠0, a query is then made in 144 as to whether this pedal travel s is shorter than that at which consumption friendly, i.e. fuel efficient, operation is still possible at the momentary number of engine revolutions per minute. If this is the case, a query is then made at 145 as to whether the momentary gear G is not yet the highest gear GG. If the highest gear has not yet been employed, the number of engine revolutions per minute nN for the next higher gear (G+1) is calculated according to block 146 and then a query is made at 147 as to whether this number of engine revolutions nN is lower than the number of engine revolutions per minute still permissible at the momentary engine temperature T. If this is not the case, a time delayed haptic signal (HA) is actuated according to block 148. Then a query is made at 149 as to whether the number of engine revolutions per minute n is still greater than the technical minimum number n min. If the result of this query is negative, a query is made at 150 as to whether the momentary gear G is still higher than first gear and if not, the clutch is disengaged at 151 and at 152 the throttle is actuated for idling. Then the system advances to step 170.

If, however, the response to query 150 is positive, i.e. the momentary gear is a higher gear than first gear, the next lower gear (G−1) is employed at 153 and at 154 clutch engagement and shifting proceeds (K+Sch), while the throttle brings the engine up to the new number of engine revolutions per minute (D=f(G,n)). Then, according to block 155, the throttle is controlled as a function of pedal travel s and number of engine revolutions per minute n according to the characteristics of FIG. 10.

If the result of the query at step 149 is positive, i.e. the number of engine revolutions per minute is still higher than the technical minimum number, a query is made at 156 as to whether the number of engine revolutions per minute n is still lower than the technically permissible maximum number n max. If yes, a query is then made at 157 as to whether pedal travel s is longer than pedal travel sS at threshold S. If this is true, a new engine speed range ns is determined at 158 as a function of pedal travel s and driving mode parameter F. Then a query is made at 159, as to whether the number of engine revolutions per minute is lower than this new engine speed range ns. If yes, the new gear nG is calculated according to block 160 from the driving speed v and the engine speed range ns and then, according to block 161, a clutch actuation and gear shifting process is initiated, similarly to that described above in connection with block 154. Thereafter, the system advances to block 169 which will be described below.

If the result of query 159 is negative, the system moves directly to the block 169.

If, in query 157, pedal travel s is shorter than or equal to pedal travel sS at threshold S, i.e. the result of the query in 157 is negative, a query is then made in 162, as to whether the sum of the last pedal movements is positive, i.e. the pedal has not been released. With a negative result of the query (i.e. the pedal has been released), the system also advances to block 169. Otherwise, a query is made at 163 as to Whether the number of engine revolutions n is higher than that provided at adaptive shifting point SP. If not, the system also advances to block 169, otherwise a query is made at 164 as to whether the acceleration dv/dt is greater than a gear specific value b2. If yes, the transmission is shifted up two gears (G=G+2) according to block 167. Otherwise a query is made at 165 as to whether the acceleration dv/dt is greater than a gear specific value b1. If not, the system advances to block 170, otherwise the next higher gear (G+1) is determined in block 166 as the new gear G. Then, according to block 168, the respective clutch disengagement, gear shifting and clutch engagement process and the corresponding throttle actuation again take place according to block 168.

Thereafter, according to block 169, the throttle is again controlled according to pedal travel s and number of engine revolutions n (see characteristics in FIG. 10) and, according to block 170, the last pedal travel is stored as value sA. Then the system again returns to main program 0.

If the result of the query at step 144 or 145 was negative or the result of query 147 was positive, the haptic signal (HE in block 171) initiated during an earlier program run is terminated before the number of engine revolutions per minute is checked in comparison to the minimum number of revolutions and the maximum number of revolutions per minute (queries 149 and 156).

FIG. 4 indicates that brake pedal response or contact sensor 17 (FIG. 2), which may simultaneously serve as the brake light switch, and for safety reasons in the case of brake failure also sensor 18 (FIG. 2) which senses complete depression of the brake pedal will always have priority over all accelerator pedal signals; this is preferably provided correspondingly also for brake pressure sensor 21 (FIG. 2), which, however, is not shown in detail in FIG. 4. This would require only the incorporation of one additional query similar to queries 61 and 62 in the program module. Thus a driver operating error of simultaneous actuation of the accelerator pedal and the brake pedal would be made ineffective since then the signals from the accelerator pedal would be ignored by the control system. In this connection, it is advisably provided that for a brake system failure, if the brake pedal is depressed as far as it will go (which is reported by sensor 18), the brake pedal bottom stop signal automatically initiates a shift into the range of maximum revolutions to thus produce a maximum engine braking effect.

Downshifting processes can also be initiated whenever the vehicle is on a downhill stretch or travels in a high speed range and the brakes become hot. According to an additional subprogram not shown in detail here, the engine speed range required for the load state or the weight of the vehicle on the respective downgrade required to take over a corresponding percentage of the braking power is calculated in microprocessor 10, for example, as a function of the brake pressure, the driving speed and the vehicle deceleration, and also as a function of a gear dependent vehicle specific parameter and the brake temperature. On the basis of this calculation, the required gear is determined and, after examining the permissibility of the number of engine revolutions per minute in the calculated gear, similar to the manner described in connection with FIGS. 6 and 8, the downshifting process is initiated to thus realize the desired engine braking power. At higher brake temperatures the number of engine revolutions for determination of the gear is raised additionally so as to increase the percentage of braking power furnished by the engine. A downhill grade can be detected by the microprocessor, for example, in that a check is made whether the change in vehicle speed over time, dv/dt, is greater than a gear specific stored negative parameter value or in that a check is made whether the second derivative of the vehicle speed v over time t becomes positive already during the initiation of the clutch disengagement process.

Such a determination of downhill grades is of significance for the case that, upon release of the accelerator pedal into the zero position, microprocessor 10 determines that a certain minimum number of engine revolutions per minute is still exceeded; in this case, the otherwise normally provided clutch disengagement process is suppressed to exclude an increase in vehicle acceleration (or a reduction in vehicle deceleration) when the accelerator pedal is returned to the zero position. If the brake pedal is then actuated and released again, a clutch disengagement process is initiated after each release of the brake pedal so as to permit acceleration processes on downhill grades without engine power. This also contributes to savings in fuel consumption.

If, in the just described case of movement of the accelerator pedal into the zero position and suppression of the clutch disengagement process, immediately before a new accelerator pedal actuation, it is noted that the vehicle accelerated further (dv/dt>0), i.e. on a downhill grade, in which the vehicle still accelerated in the presently employed gear in spite of the drag of the engine, microprocessor 10 (FIG. 2) preferably suppresses, for safety reasons, a possible upshifting process (based on point U) independently of accelerator pedal 25 reaching a first, at least approximate rest position (U of FIG. 3) after the zero position which otherwise determines gear selection.

Finally, program modules quite analogous to those described in connection with FIGS. 6 and 8 enable the microprocessor to control the drive train in the sense of actuating shifting processes on the basis of sudden brake pedal actuations. In this case, short reductions in brake pressure, i.e. movements of the brake pedal beyond a predetermined minimum distance and within a predetermined period of time are selectively registered as upshift instruction signals from the driver and, vice versa, short increases in brake pressure, i.e. forward and return movements of the brake pedal beyond a minimum distance and within a predetermined period of time are detected as downshift control instructions from the driver. Since the program modules provided for this purpose are completely analogous to the program modules according to FIGS. 6 and 8, further description thereof is not required. Of course, in this case of selective pickup of brake pedal movements, the corresponding shifting processes are also initiated only after a determination of the permissibility of the number of engine revolutions per minute in the new gear and additionally, in the case of upshifting, also after a determination of the appropriateness of the new gear with respect to downgrades and brake temperature.

Thus the driver is enabled, particularly on downhill grades, to perform anticipatory shifting processes also during actuation of the brake pedal.

As a whole, the above described embodiment provides that, in addition to the fully automatic shifting processes which occur without any action by the driver, the driver is able to arbitrarily execute shifting processes either by moving the accelerator pedal or the brake pedal back and forth or by releasing the accelerator pedal into the zero position and thereafter moving the accelerator pedal into an approximate rest position. On the other hand, the automatic upshifting processes customary in the past when the accelerator pedal is released are suppressed as long as the number of engine revolutions remains below a limit value and the worsening engine efficiency is indicated to the driver by the application of a haptic signal to the accelerator pedal so that he can react accordingly.

Consequently, driving safety is increased by maintaining a visual channel for the driver for the observation of the traffic area and by avoiding the need for watching visual displays such as, for example, the tachometer and fuel consumption indicator, and by the automatization of processes and the application of a haptic signal to the accelerator pedal which allows for quick and safe reactions without interference with the required observation of traffic. A further increase in safety results from the automatic downshifting during downhill travel and in a high speed range. during great decelerations due to braking (when the brakes become hot) and finally also when the operating brake fails. Brake failure due to overheating in thus practically excluded. A further advantage is the possibility of saving fuel by providing a large number of gears with an extreme overdrive spread and the automtic consumption optimized gear selection. Another advantage is that the present control system can be adapted without problems to the most varied vehicle types and individual requirements without any modification of electronic components. simply by adapting ROM's 13 and 14 of FIG. 2. Thus it becomes possible to manufacture the electronic system in economical mass produced series. Consequently. the described control system makes it possible and appropriate from an engineering point of view (no driving power is lost and no significant increase in weight is involved) as well as for economic reasons to realize automatic shifting also for less powerful vehicle. e.g. those with smaller engine displacement.

The disclosed invention can be used for all motor vehicles. passenger automobiles as well as trucks. The economic prerequisite is given by a positive cost to utility ratio. Particularly for passenger automobiles. this is accomplished by a far-reaching realization of the fuel savings potential on long trips due to overdrive gears and during acceleration and thrust phases by an engine speed dependent. consumption optimized control of the throttle or control rod. optimum mechanical efficiency of the spur gear drive and further measures.

The significant fact is here that driver acceptance appears secured since it is possible for the fist time in an automatic passenger automobile transmission. compared to a manual transmission. that no power loss occurs and it is possible for the first time to enable the driver to take anticipatory corrective measures in the selection of gears by way of the accelerator pedal.

Due to the fact that it is possible to adapt the control system according to the invention without problems to the most varied vehicle types without any changes in hardware. simply by storing the various characteristics and parameters and because of the increasing performance capability of microprocessors and peripheral components. it is possible without problems to manufacture the control system in large series at prices that are acceptable on the market.

For trucks having finely graduated multi-gear automatic auxiliary transmissions as they are already in use. it is possible. on the one hand. even with computer controlled automatic initiation of the gear shifting processes. to reduce the frequency of shifting to the necessary degree. On the other hand. the driver is able for the first time to make anticipatory selections of gears by way of the accelerator pedal and on downgrades by means of the brake pedal. During downhill travel, the required downshifting processes and the actuation of the retarder are initiated in principle fully automatically unless already put into effect as an anticipatory measure by the driver. Thus human error is excluded which is certainly a quite significant contribution to the improvement of traffic safety particularly in connection with buses and heavy tractor-trailer units.

I claim:

1. A method of controlling a device train for motor vehicles equipped with an electronic engine power control which has as associated accelerator pedal for the actuation of a throttle valve or control rod, a brake pedal and an automatic transmission on the basis of operating data. and stored driving speeds corresponding to different driving modes. wherein movements of the accelerator pedal and/or the brake pedal are monitored for motion sequences including changes in the direction of movement and certain. predetermined courses of change of the direction of the movements are selectively detected as specific direct and intentional gear selection control instructions from the driver. with the respective gear and its permissibility being calculatively determined and checked on the basis of the operating data and stored driving modes. whereupon a change of gears, if required. including actuation of the clutch. is initiated and. during the gear changing process. the engine power control system brings the engine to the number of engine revolutions resulting for the new gear independently of the position of the accelerator pedal. and wherein. in addition. automatic upshifting processes due to merely a release of the accelerator pedal are suppressed as long as the number of engine revolutions per minute remains below a permissible maximum number of revolutions per minute.

2. A method according to claim 1. in one of said predetermined courses of change of the direction of movement of said accelerator pedal motion sequence in which the accelerator pedal. with the motor vehicle moving. is brought into a zero position and from this zero position into a first at least approximately steady rest position in which the velocity of the accelerator pedal movement falls below a predetermined value. the engine speed range associated with this accelerator pedal rest position is determined on the basis of characteristic values stored for this purpose. with the number of engine revolutions per minute associated with the respective accelerator pedal position being approached continuously. including that. already during the pedal movement but no later than at the moment of the first accelerator pedal rest position and. in dependence on the momentary vehicle speed. the associated gear is determined and the shifting and clutch engagement process is initiated. whereupon the engine power is again controlled by the position of the throttle valve or control rod primarily in dependence on the position of the accelerator pedal.

3. A method according to claim 2. wherein a driving mode parameter. which indicates the driving style of the driver and influences the number of revolutions per minute at which shirting takes place and/or the engine torque limits. is determined from the velocity of the movement of the accelerator pedal out of the zero position into the fist at least approximate rest position.

4. A method according to claim 3, wherein if the averaged velocity of the accelerator pedal movements is greater than a predetermined velocity value, a driving mode parameter of a driving mode for power oriented driving is determined at which higher numbers of revolutions per minute for shifting and/or critical engine torques are determined than for another driving mode parameter of a driving mode for fuel consumption optimized driving which is determined if the averaged velocity of the accelerator pedal movements is lower than the predetermined velocity value.

5. A method according to claim 3. wherein the driving mode parameter is determined anew after each movement of the accelerator pedal into the zero position and out of this zero position into the first at least approximate rest position.

6. A method according to claim 1, wherein if the accelerator pedal moves into a zero position due to downhill travel, an otherwise provided clutch disengagement process is suppressed as long as the number of engine revolutions per minute exceeds a predetermined minimum number of revolutions per minute.

7. A method according to claim 6, wherein in the case of brake pedal actuation after the end of a braking process and release of the brake pedal, a clutch disengagement process is initiated.

8. A method according to claim 6, wherein if the accelerator pedal is moved from the zero position into the first at last approximate rest position and the clutch disengagement process is suppressed, an upshifting process is suppressed independently of the fact that this rest position would otherwise determine the gear selection.

9. A method according to claim 1, wherein one of said predetermined courses of change of the direction of movement of said accelerator pedal motion sequence includes a back and forth movement of the accelerator pedal beyond a predetermined minimum distance and within a predetermined period of time which is sensed as an arbitrary gear change control instruction, with a back and return movement of the accelerator pedal being determined as an upshift control instruction and a forward and return movement of the accelerator pedal being determined as a downshift control instruction, with a gear change being initiated after a calculative check of the permissibility of the number of engine revolutions per minute in the new gear.

10. A method according to claim 1, wherein changes in the direction of movement of the brake pedal are sensed by monitoring the course of the brake pressure, and a temporary reduction in pressure by a predetermined minimum amount within a predetermined time period is selectively determined as an upshift control instruction, whereas a temporary pressure increase by a predetermined minimum amount within a predetermined period of time is selectively determined as a downshift control instruction, with a change in gears being initiated after a calculative check of the permissibility of the number of engine revolutions per minute in the new gear.

11. A method according to claim 10, wherein before the actuation of a change in gears when an upshift control instruction has been determined, the permissibility of the new gear with respect to the brake temperature and/or a possible downgrade is additionally determined.

12. A method according to claim 1, wherein if the accelerator pedal is moved into a predetermined position which can be detected by a force threshold becoming effective, and is held in such a position, the throttle valve or control rod is continuously actuated in correspondence with the number of engine revolutions per minute so that the optimum specific fuel consumption for the respective number of engine revolutions per minute according to the engine characteristics is realized.

13. A method according to claim 12, wherein the position in which the force threshold becomes effective is changed in correspondence with the throttle valve or control rod position, so that optimum engine efficiency is realized at the respective number of engine revolutions per minute.

14. A method according to claim 12, wherein if the accelerator pedal moves beyond the force threshold position, continuously increasing minimum engine revolution per minute numbers are associated with the accelerator pedal positions.

15. A method according to claim 1, wherein if the accelerator pedal is released and automatic upshift processes are suppressed, the continuously less favorable engine efficiency is signaled to the driver by the application of a haptic signal, the haptic signal being in the form of continuously increasing pulses or vibrations, to the accelerator pedal.

16. A method according to claim 15, wherein the haptic signal is applied to the accelerator pedal with a time delay.

17. A method according to claim 1, wherein before selectively sensing the predetermined motion sequences including changes in the direction of movement, a check is made as to the presence of signals from sensors for the brake pressure, for the response of the brake pedal and for a brake pedal that has been moved into its end position, with the presence of such sensor signals causing the selective sensing of motion sequences including changes in the direction of movement of the accelerator pedal to be suppressed and downshifting processes to be initiated during downhill travel and also on level ground within a speed range above a predetermined speed value if the brakes are hot.

18. A method according to claim 17, wherein for the initiation of downshift processes, the engine speed range is calculated as a function of the brake pressure, the vehicle speed the gear previously employed, the vehicle deceleration, and the brake temperature, and the required transmission gear is determined on the basis of these calculations while the permissibility of the number of engine revolutions per minute in the determined gear is examined.

19. An apparatus for implementing the method according to claim 1, including at least one set-point adjuster for the driving power which is associated with an accelerator pedal serving as power control member, and senses the position of said pedal and is connected with a processor control unit for determining a suitable gear and for automatically controlling gear shifting processes, with the processor control unit being connected at its input with a memory device for characteristic data for the motor vehicle, with at last one sensor associated with the brake pedal and with other sensors for picking up operating data, such as the number of engine revolutions per minute, driving speed, position of clutch and gear identification while its output is connected with an output circuit for controlling the transmission, the clutch and the valve throttle or control rod, the processor control unit comprising a module for constantly monitoring the movements of the accelerator pedal and/or the brake pedal for motion sequences including changes in the direction of movement and for selectively sensing certain predetermined motion sequences including changes in the direction of movement as direct gear selection control instructions from the driver.

20. An apparatus to claim 19, wherein the processor control unit includes a processor which is connected to a program memory in the form of a ROM, including fixed program modules for detecting certain motion sequences that include changes in the direction of movement.

21. An apparatus according to claim 19, wherein the accelerator pedal has an associated separate sensor which senses a zero position of the accelerator pedal.

22. An apparatus according to claim 19, wherein the processor control unit is connected, at priority inputs, with a brake pressure sensor, a brake pedal contact sensor and a safety sensor which senses the completely depressed position of the brake pedal.

23. An apparatus according to claim 19, wherein a separate spring is provided to realize the force threshold for the accelerator pedal.

24. An apparatus according to claim 19, wherein an actuator which is controlled by the processor control unit is provided to realize the force threshold for the accelerator pedal.

25. An apparatus according to claim 19, wherein the accelerator pedal has an associated electromechanical drive controlled by the processor control unit, for application of haptic signals.

* * * * *